US007869907B2

(12) United States Patent
Kaneko

(10) Patent No.: US 7,869,907 B2
(45) Date of Patent: Jan. 11, 2011

(54) INFORMATION PROCESSING SYSTEM, INFORMATION PROCESSING TERMINAL, AND FILE MANAGEMENT METHOD

(75) Inventor: Yasuyuki Kaneko, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 1021 days.

(21) Appl. No.: 11/627,612

(22) Filed: Jan. 26, 2007

(65) Prior Publication Data

US 2007/0185626 A1 Aug. 9, 2007

(30) Foreign Application Priority Data

Jan. 30, 2006 (JP) ............................ 2006-020603

(51) Int. Cl.
*G06F 17/00* (2006.01)

(52) U.S. Cl. .............................. 701/2; 710/38; 710/15; 709/224; 725/131

(58) Field of Classification Search .................... 701/2, 701/70; 340/825.72, 665; 307/116; 200/600; 345/156; 710/38, 15; 709/224; 725/131
See application file for complete search history.

(56) References Cited

U.S. PATENT DOCUMENTS 3,810,105 A * 5/1974 England ...................... 710/43
4,124,889 A * 11/1978 Kaufman et al. ............... 710/2
4,912,552 A * 3/1990 Allison et al. ................. 725/21
5,012,405 A 4/1991 Nishikado et al.
5,488,695 A * 1/1996 Cutter ........................ 710/110
5,764,895 A * 6/1998 Chung ........................ 709/250
5,784,581 A * 7/1998 Hannah ...................... 710/110
5,787,256 A * 7/1998 Marik et al. ................ 709/238

(Continued)

FOREIGN PATENT DOCUMENTS

CN 201000648 Y * 1/2008

(Continued)

OTHER PUBLICATIONS

Durr, M., "Moving Beyond Basic Remote Control," LAN Times, vol. 12, No. 20, p. 76, Oct. 1995.*

(Continued)

*Primary Examiner*—Cuong H Nguyen
(74) *Attorney, Agent, or Firm*—Brinks Hofer Gilson & Lione

(57) ABSTRACT

There is provided an information processing system having a first terminal, a second terminal, and a wireless communication device which wirelessly connects the first terminal and the second terminal with each other for communication, where the first terminal and the second terminal respectively have a file system, the information processing system including a GUI providing unit that provides a display screen of the second terminal with a GUI of the file system, an operation reception unit that receives a user operation carried out on a GUI screen provided by the GUI providing unit, an operation determination unit that determines whether the user operation received by the operation reception unit is an operation relating to the first terminal or not, and an activation unit that, upon the operation determination unit determining that the user operation is an operation relating to the first terminal, controls the wireless communication device to transmit an instruction to turn on a power supply of the first terminal to the first terminal, and simultaneously carries out a process to wirelessly connect the first terminal and the second terminal with each other via the wireless communication device.

15 Claims, 18 Drawing Sheets

EXAMPLE OF OPERATION OF INFORMATION PROCESSING SYSTEM ACCORDING TO FIRST EMBODIMENT WHILE APPLICATION IS RUNNING

EXAMPLE OF FUNCTION CONFIGURATION OF PC ACCORDING TO SECOND EMBODIMENT

U.S. PATENT DOCUMENTS

| | | | | | |
|---|---|---|---|---|---|
| 5,832,492 | A * | 11/1998 | Wooten | 1/1 |
| 5,886,732 | A * | 3/1999 | Humpleman | 725/49 |
| 6,189,040 | B1 * | 2/2001 | Oohara | 709/238 |
| 6,483,844 | B1 * | 11/2002 | Erimli | 370/428 |
| 6,577,934 | B2 * | 6/2003 | Matsunaga et al. | 701/29 |
| 6,812,851 | B1 * | 11/2004 | Dukach et al. | 340/815.4 |
| 7,120,433 | B2 * | 10/2006 | Gladwin et al. | 455/426.1 |
| 7,243,746 | B1 * | 7/2007 | Vasant | 180/6.5 |
| 7,512,671 | B1 * | 3/2009 | Gladwin et al. | 709/219 |
| 7,565,474 | B2 * | 7/2009 | Ohara et al. | 710/316 |
| 2002/0116103 | A1 * | 8/2002 | Matsunaga et al. | 701/29 |
| 2003/0158614 | A1 * | 8/2003 | Friel et al. | 700/94 |
| 2004/0260470 | A1 * | 12/2004 | Rast | 701/300 |
| 2007/0112939 | A1 * | 5/2007 | Wilson et al. | 709/219 |
| 2007/0185626 | A1 * | 8/2007 | Kaneko | 701/2 |
| 2008/0086391 | A1 * | 4/2008 | Maynard et al. | 705/28 |
| 2009/0029671 | A1 * | 1/2009 | Cho et al. | 455/345 |
| 2009/0187314 | A1 * | 7/2009 | Kitamura et al. | 701/45 |

FOREIGN PATENT DOCUMENTS

| | | | |
|---|---|---|---|
| JP | 2001080525 | A * | 3/2001 |
| JP | 2002199511 | A * | 7/2002 |
| JP | 2007200199 | A * | 8/2007 |
| KR | 2002062527 | A * | 7/2002 |
| KR | 2005100476 | A * | 10/2005 |

OTHER PUBLICATIONS

IEE Colloquium on 'Vehicle Electrical Power Management and Smart Alternators' (Digest No. 53); Vehicle Electrical Power Management and Smart Alternators, IEE Colloquium on; Publication Year: 1988.*

New concepts for vehicle electrical systems; Frister, M.; Henneberger, G.; Vehicle Electrical Power Management and Smart Alternators, IEE Colloquium on; Publication Year: 1988 , pp. 6/1-6/4.*

Programmable and automatically-adjustable sense-amplifier activation scheme and multi-reset address-driven decoding scheme for high-speed reusable SRAM core; Suzuki, T. et al.; VLSI Circuits Digest of Technical Papers, 2002. Symposium on; Digital Object Identifier: 10.1109/VLSIC.2002.1015039; Publication Year: 2002 , pp. 44-45.*

Performance analysis of DS/SS inter-vehicle communication assisted by road-vehicle communication; Kuge, T.et al.; ITS Telecommunications, 2008. ITST 2008. 8th International Conference on; Digital Object Identifier: 10.1109/ITST.2008.4740299 Publication Year: 2008 , pp. 424-427.*

24GHz Software-Defined Radar System for Automotive Applications; Hui Zhang; Lin Li; Ke Wu; Wireless Technologies, 2007 European Conference on; Digital Object Identifier: 10.1109/ECWT.2007.4403965; Publication Year: 2007 , pp. 138-141.*

Feasibility study on a highly mobile microwave-band broad-band telecommunication system; Harada, H. et al.; Intelligent Transportation Systems, IEEE Transactions on; vol. 3 , Issue: 1; Digital Object Identifier: 10.1109/6979.994797 Publication Year: 2002 , pp. 75-88.*

Security and Privacy Issues for Inter-vehicle Communications in VANETs; Tat Wing Chim et al.; Sensor, Mesh and Ad Hoc Communications and Networks Workshops, 2009. SECON Workshops '09. 6th Annual IEEE Communications Society Conference on; Digital Object Identifier: 10.1109/SAHCNW.2009.5172962; Publication Year: 2009, pp. 1-3.*

Apply Cellular Wireless Location Technologies to Traffic Information Gathering; Guo Li mei et al.; Intelligent Computation Technology and Automation, 2009. ICICTA '09. Second International Conference on; vol. 3; Digital Object Identifier: 10.1109/ICICTA.2009.586; Publication Year: 2009 , pp. 499-502.*

* cited by examiner

EXAMPLE OF HARDWARE CONFIGURATION OF INFORMATION PROCESSING SYSTEM ACCORDING TO FIRST TO THIRD EMBODIMENTS

EXAMPLE OF SOFTWARE CONFIGURATION OF PC ACCORDING TO FIRST TO FOURTH EMBODIMENTS

EXAMPLE OF FUNCTION CONFIGURATION OF PC ACCORDING TO FIRST EMBODIMENT

EXAMPLE OF GUI SCREEN ACCORDING TO FIRST EMBODIMENT

EXAMPLE OF GUI SCREEN ACCORDING TO FIRST EMBODIMENT

EXAMPLE OF GUI SCREEN ACCORDING TO FIRST EMBODIMENT

EXAMPLE OF GUI SCREEN ACCORDING TO FIRST EMBODIMENT

EXAMPLE OF OPERATION OF INFORMATION PROCESSING SYSTEM ACCORDING TO FIRST EMBODIMENT WHILE APPLICATION IS RUNNING

EXAMPLE OF OPERATION OF INFORMATION PROCESSING SYSTEM ACCORDING TO FIRST TO FOURTH EMBODIMENTS UPON FINISH OF APPLICATION

EXAMPLE OF FUNCTION CONFIGURATION OF PC ACCORDING TO SECOND EMBODIMENT

EXAMPLE OF OPERATION OF INFORMATION PROCESSING SYSTEM ACCORDING TO SECOND EMBODIMENT WHILE APPLICATION IS RUNNING

EXAMPLE OF FUNCTION CONFIGURATION OF PC ACCORDING TO THIRD EMBODIMENT

EXAMPLE OF GUI SCREEN ACCORDING TO THIRD EMBODIMENT

EXAMPLE OF HARDWARE CONFIGURATION OF INFORMATION PROCESSING SYSTEM ACCORDING TO FOURTH EMBODIMENT

EXAMPLE OF GUI SCREEN ACCORDING TO FOURTH EMBODIMENT

EXAMPLE OF FUNCTION CONFIGURATION OF PC ACCORDING TO FOURTH EMBODIMENT

EXAMPLE OF OPERATION OF INFORMATION PROCESSING SYSTEM ACCORDING TO FOURTH EMBODIMENT WHILE APPLICATION IS RUNNING

EXAMPLE OF OPERATION OF INFORMATION PROCESSING SYSTEM ACCORDING TO FOURTH EMBODIMENT WHILE APPLICATION IS RUNNING

ANOTHER EXAMPLE OF OPERATION OF INFORMATION PROCESSING SYSTEM ACCORDING TO FOURTH EMBODIMENT WHILE APPLICATION IS RUNNING

HIERARCHICAL STRUCTURE FOR FILE MANAGEMENT

EXAMPLE OF GUI FOR FILE MANAGEMENT
FIG. 21 (a) TREE STRUCTURE
FIG. 21 (b) WINDOW STRUCTURE
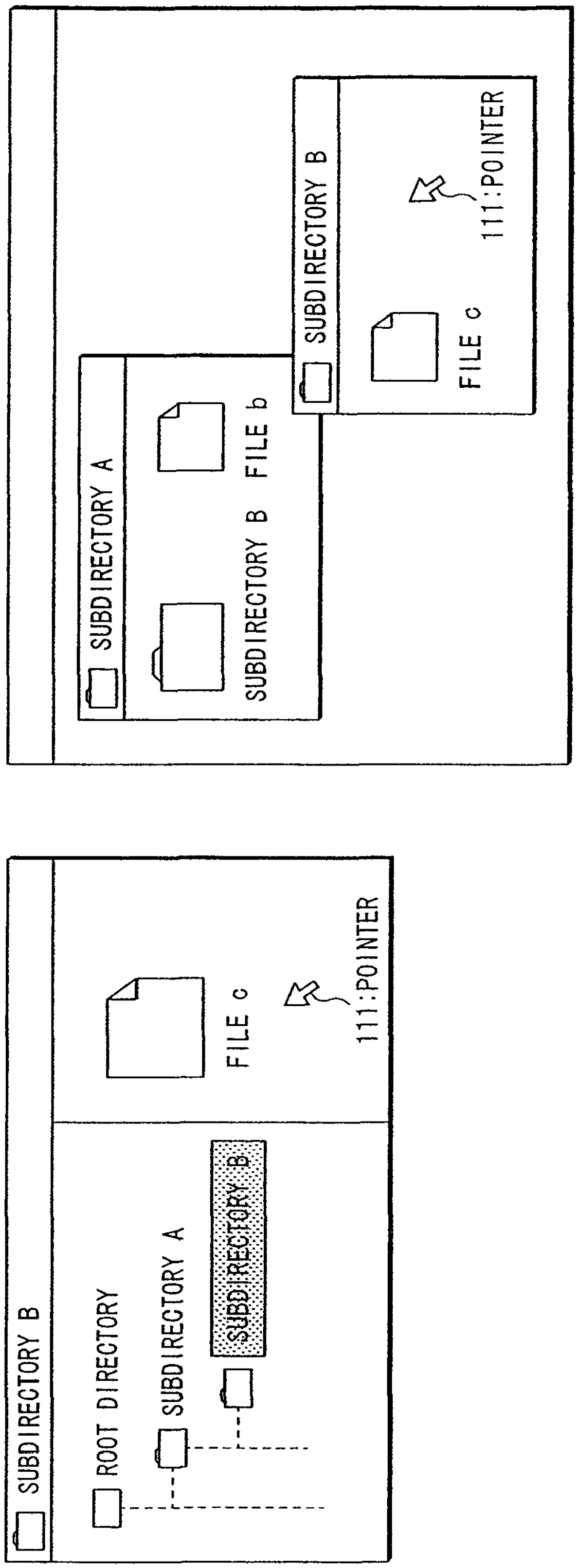

INFORMATION PROCESSING SYSTEM, INFORMATION PROCESSING TERMINAL, AND FILE MANAGEMENT METHOD

RELATED APPLICATIONS

The present application claims priority to Japanese Patent Application Serial Number 2006-020603, filed Jan. 30, 2006, the entirety of which is hereby incorporated by reference.

BACKGROUND OF THE INVENTION

1. Field of the Invention

The present invention relates to an information processing system, an information processing terminal, and a file management method. More particularly, the present invention relates to a technology for moving and copying files by means of a file system.

2. Description of the Prior Art

Presently, a file system generally uses an information processing device such as a personal computer (referred to as PC hereinafter) to manage files in a hierarchical structure as shown in FIG. 20. According to the file management of this type, the upper most root directory R includes a subdirectory A and a file a, and the subdirectory A can further include a lower subdirectory B and a file b. The lower subdirectory B includes a file c, for example.

The hierarchical structure managed by this file system is often provided for users as a GUI (Graphical User Interface) on a window system. A subdirectory on the GUI is referred to as a folder. The GUI includes: a type shown in FIG. 21(*a*) where folders and files are provided as a tree structure, and a type shown in FIG. 21(*b*) where folders and files are provided as virtual screens referred to as windows.

On screens of the GUI shown in FIGS. 21(*a*) and 21(*b*), the folders and files are represented as schematic graphics referred to as icons. Moreover, there is shown an arrow, which specifies a point on the screen, referred to as a pointer 111. The folders and files shown on the screen can be moved or copied to an arbitrary location in the hierarchical structure shown in FIG. 20 by freely moving the pointer 111 on the screen by means of a pointing device such as a mouse.

For example, if the file c under the subdirectory (folder) B is to be moved under the subdirectory (folder) A, the pointer 111 is first moved on an icon for the file c under the folder B by moving the mouse. Then, the icon for the file c is dragged to an icon or a window for the folder A by depressing a determination button (left button if the mouse has two left and right buttons) of the mouse, and moving the pointer 111 while the determination button is being depressed. Then, the icon for the file c is dropped by releasing the determination button on the icon or the window for the folder A. With this operation, the file c can be moved from the folder B to the folder A.

In order to simplify an operation for repeatedly moving files, there is proposed a technology which provides means to store history of operations of file management information shown on a screen, and uses the stored information for operations previously carried out to enable to easily move a file without requiring excessive operations by a user (refer to Japanese Laid-Open Patent Publication (Kokai) No. H6-103014, for example).

Recently, hard disks, which can sufficiently withstand hard vibrations and changes in temperature in a vehicle cabin, have been developed, and vehicle onboard audio devices employing such hard disks have become commercially available. With this type of vehicle onboard audio devices, it is possible to enjoy playing audio and video without repeatedly inserting and ejecting multiple media such as CDs (Compact Discs) and DVDs (Digital Versatile Disks) by converting audio and video data stored on the media into audio files and video files, and recording these files on a hard disk.

This type of vehicle onboard machine, which employs a hard disk for storing files, uses a file system, and can manage multiple files in the hierarchical structure as shown in FIG. 20. It is also possible to move or copy a file stored on a PC to a hard disk of a vehicle onboard machine by means of this file system.

However, it is conventionally necessary to carry out the following sequence of operations to move or copy a file stored in the PC to the hard disk of the vehicle onboard machine. First, a removable medium such as a semiconductor memory is connected to the PC. A file system running on the PC recognizes the connected removable medium, and shows a file management screen including an icon for the removable medium as shown in FIG. 21 on a display device of the PC. The user moves a file to be moved or copied from the PC to the removable medium by the drug and drop operation as described above.

Then, the removable medium is removed from the PC, and is connected to the vehicle onboard machine. A file system running on the vehicle onboard machine recognizes the connected removable medium, and shows a file management screen including an icon for the removable medium as shown in FIG. 21. The user moves a file to be moved or copied from the removable medium to the hard disk of the vehicle onboard machine by the drag and drop operation as described above. Therefore, it is necessary to move or copy a file stored in the PC to the hard disk of the vehicle onboard machine by means of the above series of operations, and there thus poses a problem that these operations are complicated and very time consuming.

It should be noted that there are products which have a portable hard disk for a vehicle onboard machine. With this type of products, it is possible to directly move or copy a file between the PC and the vehicle onboard machine by directly connecting the hard disk of the vehicle onboard machine to the home PC. However, even in this case, there poses a problem that it is necessary to carry out a time consuming operation to remove the hard disk of the vehicle onboard machine, and to connect the hard disk to the PC.

Moreover, recently, there are widely available wireless LAN (Local Area Network) products which connect between PCs. If the PC and the vehicle onboard machine are wirelessly connected via this wireless LAN, it is possible to directly move or copy a file between the PC and the vehicle onboard machine without removing the hard disk of the vehicle onboard machine, and connecting the hard disk to the PC, which is time consuming. Though the transmission speed of the wireless LAN is not as fast as that of the wired LAN, the speed is fast enough for a protocol for authentication communication, and can provide wireless communication at a distance of 100 m for indoors, and 500 m for outdoors, which is considered practical.

However, the vehicle onboard machine usually turned off when the vehicle is parked in a garage at home, the file system is not thus active, and file cannot be moved or copied. Though the vehicle onboard machine is turned on while the vehicle is traveling, the distance between the PC at home and the vehicle onboard machine exceeds the communicable distance of the wireless LAN, and files cannot be moved or copied in this case either. Eventually, for the wireless communication between the PC and the vehicle onboard machine, it is necessary to purposely turn on the vehicle onboard machine while the vehicle is being parked in the garage at home.

Moreover, it is also necessary to purposely turn off the vehicle onboard machine when files have been moved or copied, which is very time consuming.

SUMMARY OF THE INVENTION

The present invention is devised to solve these problems, and has an object of easily moving or copying files between a PC and a vehicle onboard machine without a time consuming operation.

In order to solve the above problems, according to one aspect of the present invention, if an operation relating to a first terminal (such as a vehicle onboard machine) is carried out via a GUI screen provided on a display screen of a second terminal (such as a PC), there may be carried out a process to transmit an instruction to turn on a power supply of the first terminal, which is the subject to the operation, to the first terminal from a wireless communication device, and simultaneously to wirelessly connect the first terminal and the second terminal with each other via the wireless communication device. If the operation relating to the first terminal is an operation to move or copy a file or a folder (simply referred to as file hereinafter), the operation to move or copy the file is carried out after the wireless connection between the first terminal and the second terminal is established.

Moreover, according to another aspect of the present invention, there may be carried out an operation to transmit an instruction to turn off the power supply of the first terminal from the wireless communication device to the first terminal, and simultaneously, to disconnect the wireless connection between the first terminal and the second terminal when a file specified by a user operation has been moved or copied, or on a predetermined timing subsequent thereto.

Moreover, according to a further aspect of the present invention, it is determined whether there is reached a state where the first terminal and the second terminal can wirelessly communicate with each other as a result of an activation process. If such a state is not reached, information on a user operation is temporarily stored in a memory, and a file specified by the user operation is moved or copied according to the information on the user operation stored in the memory when there is reached the state where the wireless communication is possible.

According to one implementation of present invention configured as described above, since the first terminal and the second terminal are wirelessly connected with each other, and a file is moved or copied by means of wireless communication, it is not necessary to move or copy a file by means of a removable medium. Additionally, it is not necessary to carry out a time consuming operation to remove a hard disk from the first terminal, and to connect the hard disk to the second terminal. Moreover, even if the power supply of the first terminal to which a file is moved or copied is turned off, since it is possible to automatically turn on the power supply of the first terminal by means of wireless communication in association with a user operation carried out on the second terminal, it is not necessary to purposely go and turn on the power supply of the first terminal. Further, when a file has been moved or copied, since the power supply of the first terminal is automatically turned off, it is not necessary to purposely go and turn off the power supply of the first terminal either. Thus, a file can be easily moved or copied between the first terminal (such as a vehicle onboard machine) and the second terminal (such as PC) without a time-consuming operation.

According to another implementation of the present invention, as described above, when the power supply of the first terminal is to be turned on via the wireless communication, if the first terminal (such as vehicle onboard machine) is out of the area where the wireless communication device can communicate with the first terminal, and the first terminal cannot wirelessly communicate with the second terminal, information on the user operation is temporarily stored in the memory. Then, when the first terminal enters the area where the wireless communication device can wirelessly communicate with the first terminal, a file is moved or copied according to the information on the user operation stored in the memory. As a result, the user can carry out an operation to move or copy a file without taking care of whether the power supply of the first terminal is turned on or not, or whether the first terminal is in an area where the first terminal can carry out wireless communication.

BRIEF DESCRIPTION OF THE DRAWINGS

FIG. 21 shows an example of a GUI screen for file management.

DESCRIPTION OF THE PREFERRED EMBODIMENTS

First Embodiment

Figure 1:
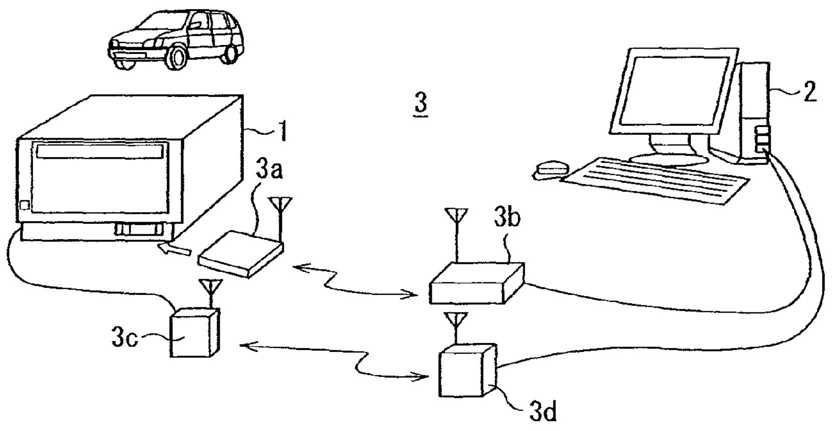
FIG. 1 shows an example of a hardware configuration of an information processing system according to the first to third embodiments.

FIG. 1 shows an example of one implementation of a hardware configuration of an information processing system. As shown in FIG. 1, the information processing system includes a vehicle onboard machine 1 as a first terminal, a PC 2 as a second terminal, and a wireless communication device 3 that wirelessly connects the vehicle onboard machine 1 and the PC 2 with each other for communication.

The vehicle onboard machine 1 may be a center unit of a car navigation device with an integrated audio system which provides a navigation function, an AV (Audio Visual) player function and the like, and is installed on a vehicle. A hard disk is installed on the vehicle onboard machine 1, and stores audio files and video files to be reproduced. In order to manage these files, the vehicle onboard machine 1 includes a file system. The PC 2 may be set up at home, and also includes a hard disk that stores audio files and video files. In order to manage these files, the PC 2 also includes a file system.

The wireless communication device 3 includes devices for wireless LAN connection, and devices for specific small power wireless connection. The wireless communication device 3 includes a wireless LAN interface card 3*a* connected to the vehicle onboard machine 1 and a wireless LAN access point 3*b* connected to the PC 2 for wireless LAN connection. Moreover, the wireless communication device 3 includes small power wireless connection devices 3*c* and 3*d* that are connected respectively to the vehicle onboard machine 1 and the PC 2 for the specific small power wireless connection.

The wireless LAN interface card 3*a* of the vehicle onboard machine 1 and the wireless LAN access point 3*b* of the PC 2 wirelessly communicate files. Moreover, the small power wireless connection devices 3*c* and 3*d* are used as system starters for the vehicle onboard machine 1. Namely, a power supply of the vehicle onboard machine 1 is switched on and off by transmitting a power supply switching instruction from the small power wireless connection device 3*d* of the PC 2 to the small power wireless connection device 3*c* of the vehicle onboard machine 1.

Figure 2:
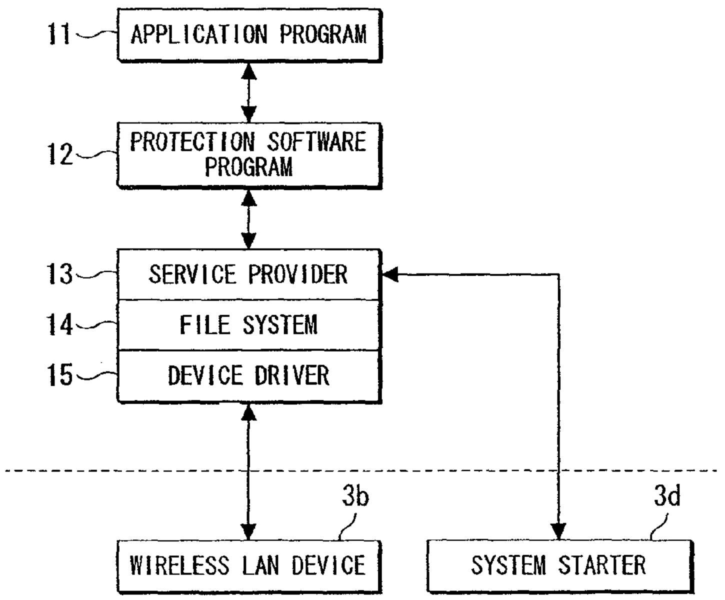
FIG. 2 shows an example of a hardware configuration of a PC according to the first to fourth embodiments.

FIG. 2 shows an example of a software configuration of the PC 2. As FIG. 2 shows, the PC 2 may include an application software program 11, a protection software program 12, a service provider 13, a file system 14, and a device driver 15. The application software program 11 is a software program relating to an application (service) directly used by a user that includes a function to transfer (move or copy) files.

The protection software program 12 is a software program to safely transfer a file and to manage restrictions on copyrights relating to a file to be transferred, for example. The service provider 13 is a software program that provides services relating to the application software program 11 and drives the system starter (small power wireless connection device 3*d* in FIG. 1) as hardware.

The file system 14 is a software program that manages files stored in the hard disk of the PC 2, creates files and folders (directories) on the hard disk, and moves, copies, and deletes files and folders. The file system 14 is provided as one of the functions of the OS (Operating System). The device driver 15 is a software program that operates the wireless LAN device (wireless LAN access point 3*b* in FIG. 1) as hardware, and bridges a gap for the OS to control the wireless LAN access point 3*b*.

Figure 3:
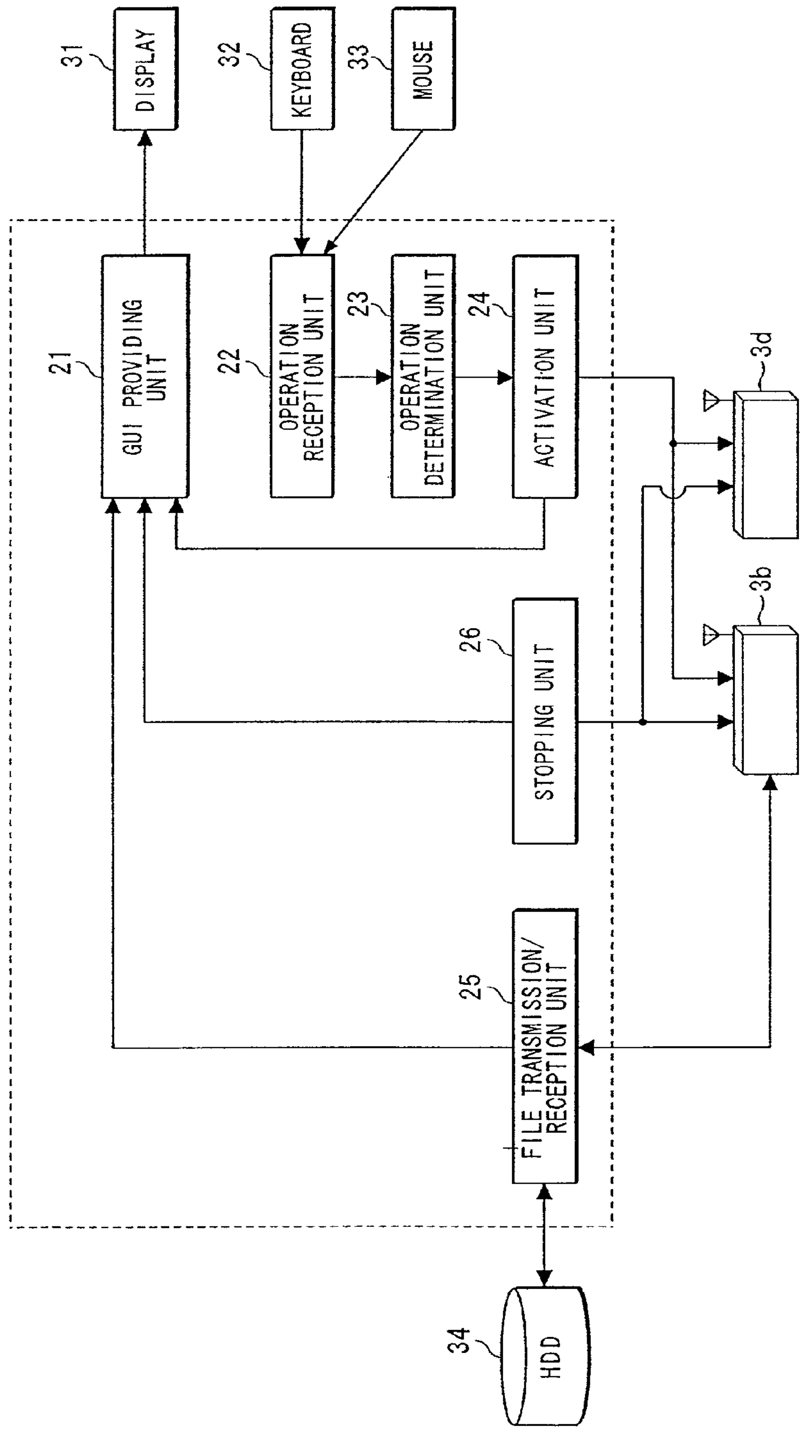
FIG. 3 is a block diagram showing an example of a functional configuration of the PC according to the first embodiment.

FIG. 3 is a block diagram showing an example of a functional configuration of the PC 2. It should be noted that FIG. 3 also shows a hardware configuration outside a frame of dotted lines. As FIG. 3 shows, the PC 2 according to one implementation of the present embodiment includes a GUI providing unit 21, an operation reception unit 22, an operation determination unit 23, an activation unit 24, a file transmission/reception unit 25, and a stopping unit 26 as the function configuration thereof. The GUI providing unit 21 is constituted by the application program 11, and the file system 14 in FIG. 2, and provides a display screen of a display 31 of the PC 2 with a GUI of the file system 14.

Figure 4:
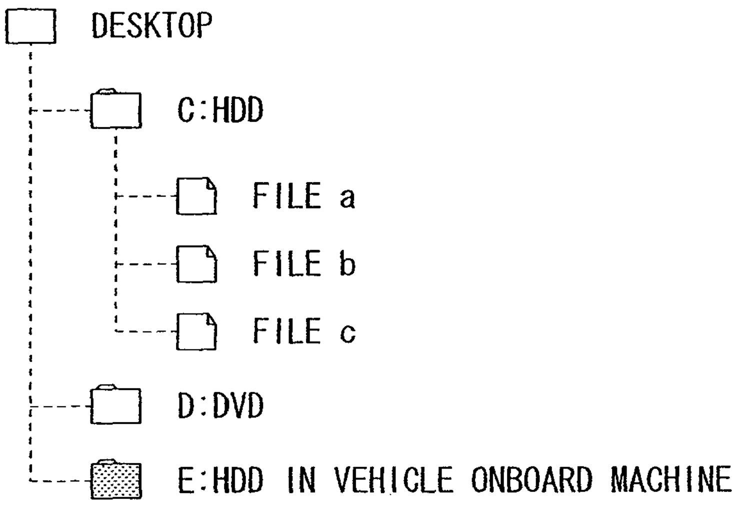
FIG. 4 shows an example of a GUI screen provided by a GUI providing unit according to the first embodiment.

FIG. 4 shows an example of a GUI screen provided by the GUI providing unit 21. The example shown in FIG. 4 provides icons representing folders and files as a tree structure. A C drive represents a hard disk in the PC 2. The icons show that the C drive contains three files a, b, and c. A D drive represents a DVD drive in the PC 2, and an E drive represents a hard disk in the vehicle onboard machine 1 connected to the PC 2 via the wireless LAN.

The hard disk of the vehicle onboard machine 1 has been recognized by the devise driver 15 when the vehicle onboard machine 1 and the PC 2 were previously connected with each other via the wireless LAN, and recognition information on that occasion is stored in the PC 2. Namely, the device driver 15 in the PC 2 carries out a device detection process to recognize the hard disk of the vehicle onboard machine 1 when the PC 2 is first wirelessly connected to the vehicle onboard machine 1. The device driver 15 in the PC 2 additionally maintains the recognition information to identify the hard disk of the vehicle onboard machine 1 in the PC 2. The application program 11 provides the GUI screen shown in FIG. 4 by adding information on the hard disk of the vehicle onboard machine 1 recognized by the device driver 15 as the E drive to information on the C drive and the D drive which are originally managed by the file system 14.

On this occasion, highlighted items on the GUI screen in FIG. 4 are items for which a power supply of a corresponding system is not turned on, and which the file system 14 thus cannot recognize. Namely, the hard disk of the vehicle onboard machine 1 shown as the E drive is turned off, and the file system 14 thus cannot recognize it. It should be noted that when the power supply of the hard disk of the vehicle onboard machine 1 is turned on, and the file system 14 recognizes the hard disk, the application program 11 resets the highlighting. In this way, the GUI providing unit 21 shows the GUI screen such that whether the power supply of the vehicle onboard machine 1 is turned on or off can be identified by the icon for the hard disk of the vehicle onboard machine 1.

Referring again to FIG. 3, the operation reception unit 22 receives a user operation carried out on a GUI screen provided by the GUI providing unit 21. The user operation is carried out by means of input devices such as a keyboard 32 and a mouse 33. For example, a pointer that indicates a position on the GUI screen is shown on the GUI screen, and an operation to move or copy a file shown as an icon on the screen to an arbitrary position is carried out by moving the pointer on the GUI screen by means of the mouse 33. The operation reception unit 22 receives an operation as described above, and outputs operation information thereon to the operation determination unit 23.

Figure 5:
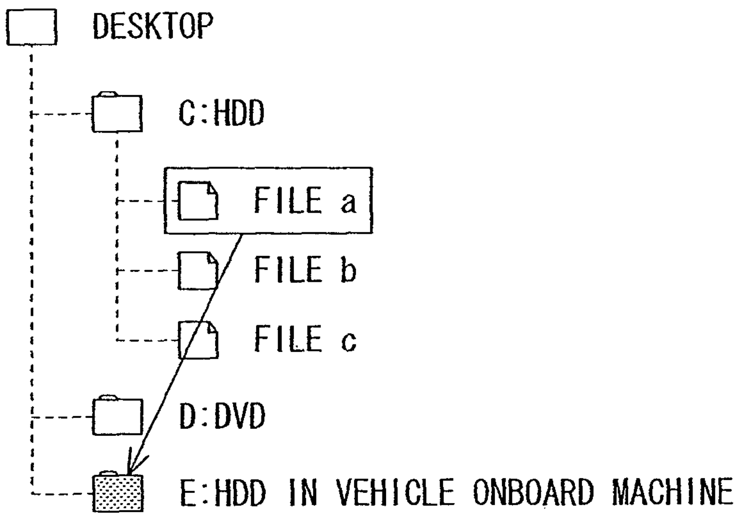
FIG. 5 shows an example of the GUI screen provided by the GUI providing unit according to the first embodiment.

The operation determination unit 23 determines whether a user operation received by the operation reception unit 22 is an operation relating to the vehicle onboard machine 1. According to this embodiment, the operation determination unit 23 specifically determines whether a user operation is to move or copy a file to the vehicle onboard machine 1. For example, as shown in FIG. 5, if a drag and drop operation is carried out to move or copy the file a from the hard disk of the PC 2 recognized as the C drive to the hard disk of the vehicle onboard machine 1 recognized as the E drive, the operation determination unit 23 determines that the user operation is an operation relating to the vehicle onboard machine 1.

If a drag and drop operation is carried out to move or copy a file a from the hard disk of the PC 2 recognized as the C drive to the DVD drive of the PC 2 recognized as the D drive, the operation determination unit 23 determines that the user operation is not an operation relating to the vehicle onboard machine 1.

If an operation to move or copy a file in the PC 2 is carried out, the file system 14 of the PC 2 may simply carry out a normal process. On the other hand, if the operation determination unit 23 determines that a user operation received by the operation reception unit 22 is an operation to move or copy a file to the vehicle onboard machine 1, the activation unit 24 carries out the following process.

Namely, if the operation determination unit 23 determines that a user operation is an operation to move a file to the vehicle onboard machine 1 or the like, the activation unit 24 controls the small power wireless connecting device 3*d* to transmit instruction information to turn on the power supply of the vehicle onboard machine 1 to the vehicle onboard machine 1 via the small power wireless connection device 3*c*. A standby power supply of the vehicle onboard machine 1 is always on, and if the vehicle onboard machine 1 receives the instruction from the activation unit 24, a main power of the vehicle onboard machine 1 is switched to on. After the activation unit 24 transmits the instruction information to turn on the power supply from the small power wireless connecting device 3*d*, the activation unit 24 carries out a process to control the wireless LAN access point 3*b* to wirelessly connect the vehicle onboard machine 1 and the PC 2 with each other.

Figure 6:
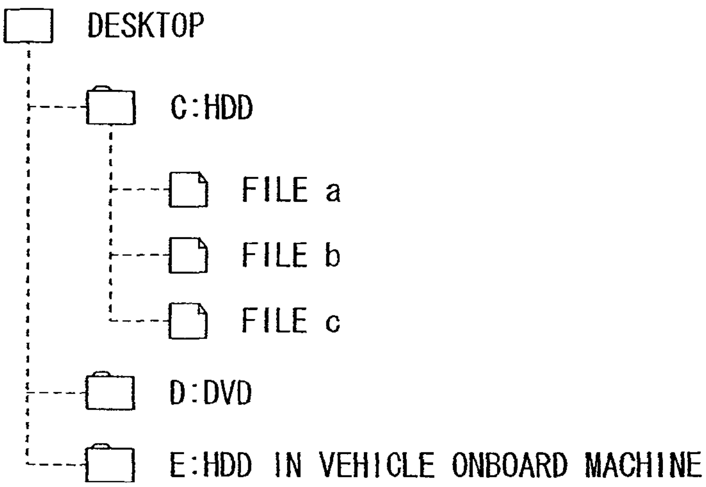
FIG. 6 shows an example of the GUI screen provided by the GUI providing unit according to the first embodiment.

When the power supply of the vehicle onboard machine 1 is turned on, and the wireless LAN connection is established between the vehicle onboard machine 1 and the PC 2, the E drive is being activated. In this state, the GUI providing unit 21, upon receiving a notice of completion of the activation from the activation unit 24, resets the highlighting of the E drive on the GUI screen as shown in FIG. 6. The file system 14 on this occasion is recognizing the hard disk of the vehicle onboard machine 1.

Figure 7:
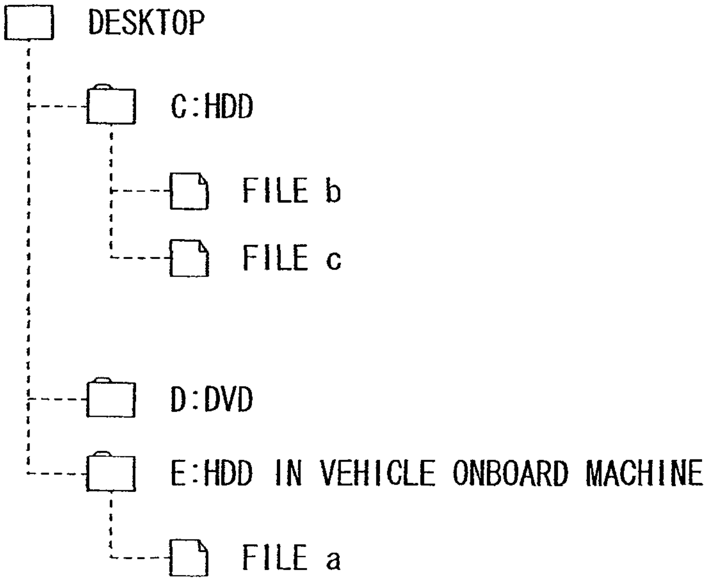
FIG. 7 shows an example of the GUI screen provided by the GUI providing unit according to the first embodiment.

The file transmission/reception unit 25 carries out a process to move or copy a file from the hard disk 34 of the PC 2 to the hard disk of the vehicle onboard machine 1 while the file system 14 is recognizing the hard disk of the vehicle onboard machine 1. When the file has been moved or copied, the GUI providing unit 21 receives a notice of the completion of the file transfer from the file transmission/reception unit 25, and the tree structure on the GUI screen is changed accordingly as shown in FIG. 7.

After the file transmission/reception unit 25 (file system 14) carries out the process to move or copy the file specified by the user operation to the vehicle onboard machine 1, the stopping unit 26 controls the small power wireless connection device 3*d* to transmit instruction information to turn off the power of the vehicle onboard machine 1 to the vehicle onboard machine 1, and simultaneously carries out a process to disconnect the wireless LAN connection between the vehicle onboard machine 1 and the PC 2. It should be noted that the process by the stopping unit 26 may not be carried out when the file has been moved or copied to the vehicle onboard machine 1, but when the application program 11 is finished. The GUI providing unit 21, upon receiving a notice of the completion of the stop from the stopping unit 26, highlights the E drive on the GUI screen.

Though the above description is given of the example to move or copy a file, a folder may be moved or copied. When the move or copy of a folder is specified, all files and folders contained in layers under the specified folder can be moved or copied at once.

Figure 8:
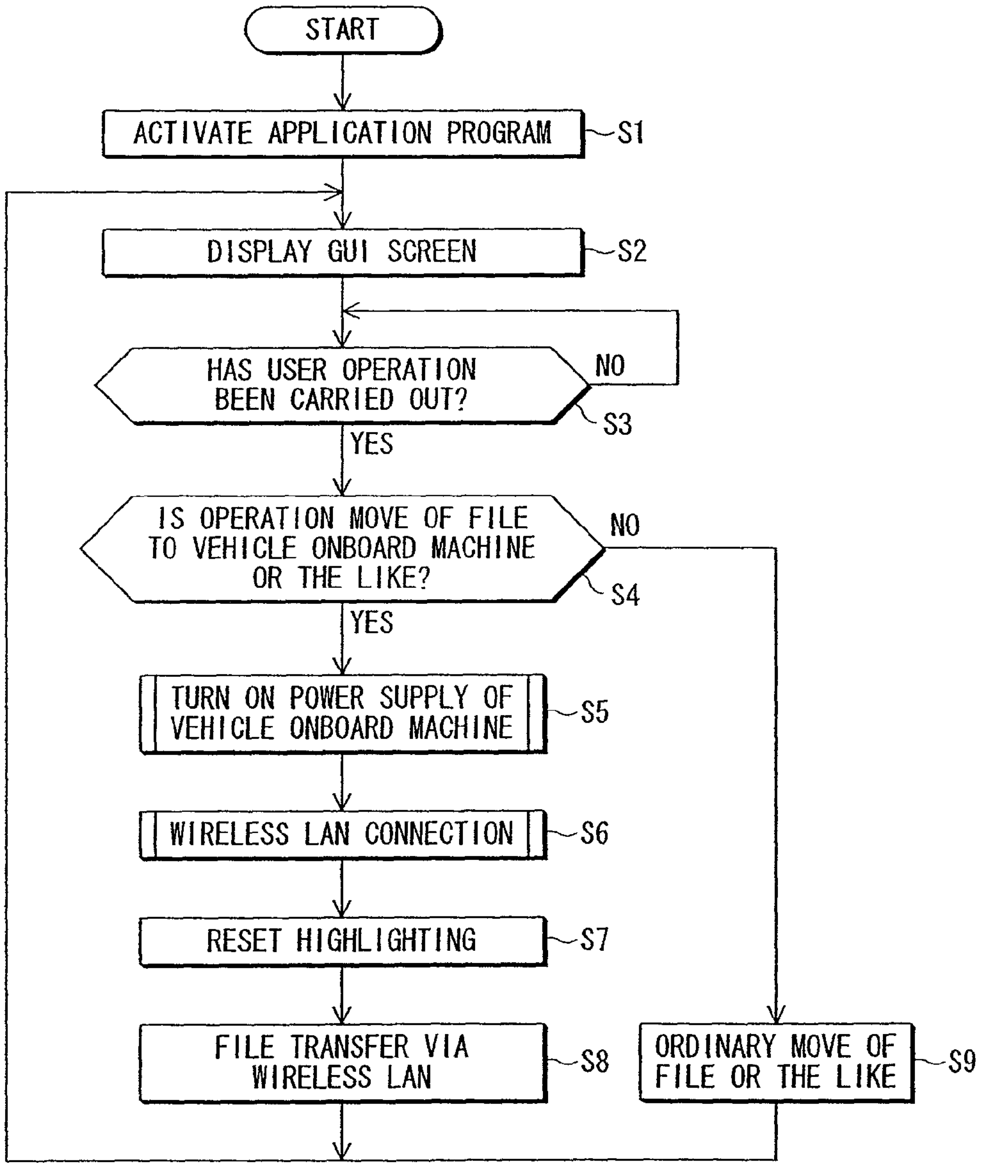
FIG. 8 is a flowchart showing an example of an operation of the information processing system according to the first embodiment while an application program is running.
Figure 9:
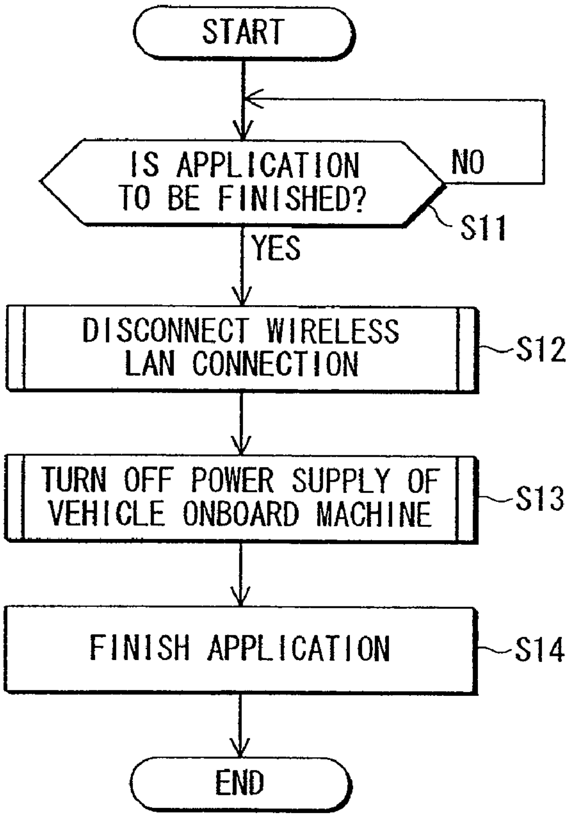
FIG. 9 is a flowchart showing an example of an operation of the information processing system according to the first to fourth embodiments when the application program is finished.

FIGS. 8 and 9 are flowcharts showing examples of operations of the information processing system. FIG. 8 shows an example of an operation while the application program 11 is running and FIG. 9 shows an example of an operation when the application program 11 is finished.

In FIG. 8, when the application program 11 starts on the PC 2 (step S1), the GUI providing unit 21 shows a GUI screen as shown in FIG. 4 on the display 31 of the PC 2 (step S2). On this occasion, the GUI providing unit 21 highlights the icon of the folder representing the hard disk of the vehicle onboard machine 1.

The operation reception unit 22 is monitoring whether a user operation is carried out via the GUI screen (step S3). If a user operation is carried out, the operation determination unit 23 determines whether the user operation is an operation to move or copy a file to the vehicle onboard machine 1 based on operation information supplied by the operation reception unit 22 (step S4).

If the user operation is an operation to move a file to the vehicle onboard machine 1 or the like, the activation unit 24 transmits the instruction information to turn on the power supply of the vehicle onboard machine 1 to the vehicle onboard machine 1 via the small power wireless connection units 3*c* and 3*d*. If the vehicle onboard machine 1 receives this instruction, the power supply of the vehicle onboard machine 1 is switched to on (step S5). Then, the activation unit 24 controls the wireless LAN access point 3*b* to carry out the process to connect the vehicle onboard machine 1 and the PC 2 with each other via the wireless LAN (step S6).

If the power supply of the vehicle onboard machine 1 is turned on, and the wireless LAN connection is established between the vehicle onboard machine 1 and the PC 2 as described above, the GUI providing unit 21 resets the highlighting of the folder representing the hard disk of the vehicle onboard machine 1 (step S7). Then, the file transmission/reception unit 25 moves or copies the file specified by the user operation from the PC 2 to the vehicle onboard machine 1 via the wireless LAN access point 3*b* and the wireless LAN interface card 3*a* (step S8).

If the operation determination unit 23 determines that the user operation is not an operation to move a file to the vehicle onboard machine 1 or the like, namely, that the user operation is an operation to move a file within the same PC 2 or the like in the step S4, the file system 14 carries out a usual process such as moving a file or the like (step S9). After the processing in the step S8 or the step S9 has been carried out, the operation returns to the processing in the step S2. On this occasion, the GUI providing unit 21 changes and shows the tree structure on the GUI screen according to a hierarchical structure after the move of the file or the like.

If termination of the application program 11 is instructed on the PC 2 in FIG. 9 (step S11), the stopping unit 26 controls the wireless LAN access point 3*b* to carry out the process to disconnect the wireless LAN connection between the vehicle onboard machine 1 and the PC 2 (step S12). The stopping unit 26 transmits the instruction information to turn off the power supply of the vehicle onboard machine 1 to the vehicle onboard machine 1 via the small power wireless connection devices 3*c* and 3*d* thereafter. If the vehicle onboard machine 1 receives this instruction, the power supply of the vehicle onboard machine 1 is switched to off (step S13). Then, the application program 11 is finished completely, and the operation ends (step S14).

As detailed above, according to the first embodiment, when an operation directed to the vehicle onboard machine 1 is carried out via the GUI screen provided on the display 31 of the PC 2, the power supply of the vehicle onboard machine 1 is turned on via the small power wireless connection devices 3*c* and 3*d*. Simultaneously, the vehicle onboard machine 1 and the PC 2 are connected with each other by means of the wireless LAN connection via the wireless LAN interface card 3*a* and the wireless LAN access point 3*b*, and a specified file is moved or copied from the PC 2 to the vehicle onboard machine 1.

According to the first embodiment, since a file is moved or copied from the PC 2 to the vehicle onboard machine 1 by means of the wireless communication, it is not necessary to carry out a time-consuming operation such as copying or moving a file via a removable medium. Additionally, it is not necessary to remove the hard disk from the vehicle onboard machine 1 and connect the hard disk to the PC 2. Moreover, even if the power supply of the vehicle onboard machine 1 is turned off, since the power supply of the vehicle onboard machine 1 is automatically switched on by means of the wireless communication in association with a user operation carried out on the PC 2, it is not necessary to go to a vehicle and turn on the power supply of the vehicle onboard machine 1.

According to the first embodiment, after a file has been moved or copied (or when the termination of the application program 11 is instructed), the wireless LAN connection between the vehicle onboard machine 1 and the PC 2 is disconnected. Simultaneously, the power supply of the vehicle onboard machine 1 is turned off via the small power wireless connection devices 3*c* and 3*d*. As a result, since the power supply of the vehicle onboard machine 1 is automatically turned off again, it is not necessary to go to a vehicle and turn off the power supply of the vehicle onboard machine 1 after a move of a file or the like.

As described above, according to the first embodiment, it is possible to easily move or copy a file from the PC 2 to the vehicle onboard machine 1 without a time-consuming operation.

Moreover, according to the first embodiment, it is determined whether a user operation is an operation to move or copy a file to the vehicle onboard machine 1 or not, and the activation unit 24 carries out the activation process if so. In this way, only if the user instructs to move or copy a file by means of an apparent operation, the power supply of the vehicle onboard machine 1 is switched to on.

For example, though clicking a folder of a vehicle onboard machine 1 on the GUI screen may cause the activation unit 24 to carry out the activation process, if a user clicks the folder of the vehicle onboard machine 1 by mistake, the activation unit 24 carries out the activation process. In this case, the power supply of the vehicle onboard machine 1 is unnecessarily turned on. Moreover, if the power supply of the vehicle onboard machine 1 is configured to turn off again when a file has been moved or copied, since a file is not moved or copied, the power supply remains on. On the other hand, if the activation process by the activation unit 24 is triggered by an operation to move a file to the vehicle onboard machine 1 or the like, the above-described inconvenience can be avoided.

Second Embodiment

Figure 10:
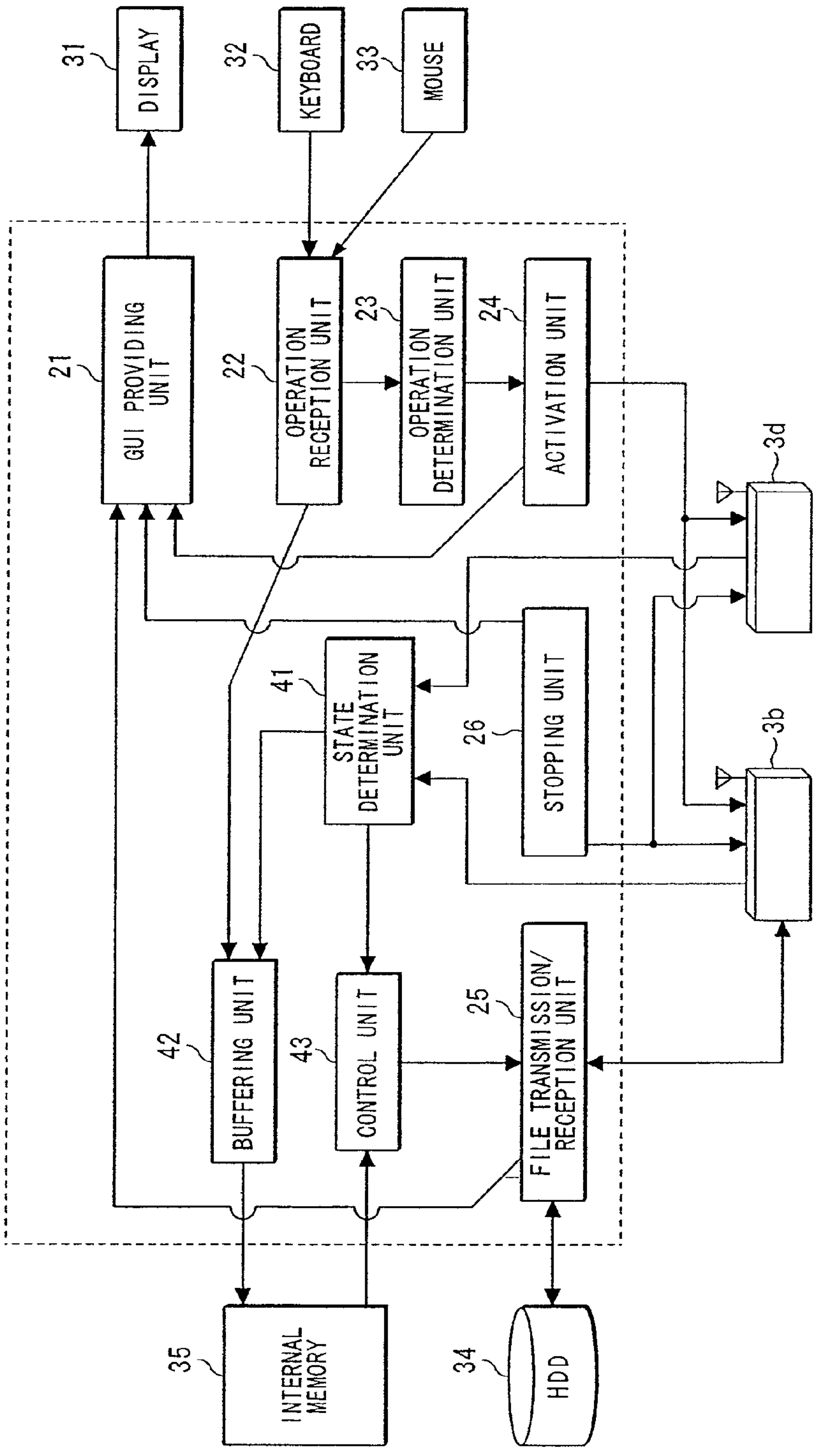
FIG. 10 is a block diagram showing an example of the functional configuration of the PC according to the second embodiment.

Below is a description of a second embodiment of the present invention with reference to drawings. One implementation of the hardware configuration of the information processing system and the software configuration of the PC 2 are the same as those in FIGS. 1 and 2. FIG. 10 is a block diagram showing an example of a functional configuration of the PC 2 according to the second embodiment. In FIG. 10, like components denoted by like numerals as of FIG. 3 have like functions, and will not be further explained.

As shown in FIG. 10, the PC 2 may include a state determination unit 41, a buffering unit 42, and a control unit 43 in addition to the function configuration shown in FIG. 3. The state determination unit 41 determines whether a state has been reached where the vehicle onboard machine 1 and the PC 2 can wirelessly communicate with each other as a result of the activation process by the activation unit 24. Specifically, the state determination unit 41 determines whether a response to the process by the activation unit 24 has been returned within a predetermined period.

Namely, when the activation unit 24 transmits an instruction to turn on the power supply of the vehicle onboard machine 1 via the small power wireless connection device 3*d*, the state determination unit 41 determines whether a response thereto is returned from the vehicle onboard machine 1. Moreover, when the activation unit 24 starts the wireless LAN connection via the wireless LAN access point 3*b*, the state determination unit 41 determines whether a response that the wireless LAN connection is established is returned from the wireless LAN access point 3*b*. Then, if the state determination unit 41 has received both the responses, the state determination unit 41 determines that there is reached the state where the vehicle onboard machine 1 and the PC 2 can wirelessly communicate with each other.

The buffering unit 42, upon the state determination unit 41 determining that there is not reached the state where the vehicle onboard machine 1 can wirelessly communicate with the PC 2, stores information on a user operation received by the operation reception unit 22 in an internal memory 35 of the PC 2. The information on the user operation to be stored is information that triggered the process carried out by the activation unit 24. For example, such information includes information representing the drag and drop operation carried out to move or copy a file a from the hard disk of the PC 2 to the hard disk of the vehicle onboard machine 1 as shown in FIG. 5.

The vehicle onboard machine 1 moves with the vehicle, and thus the vehicle onboard machine 1 is not always located close to the PC 2. When the vehicle onboard machine 1 is not in an area where the wireless communication with the PC 2 is possible, even if the activation unit 24 carries out the activation process, there is not reached the state where the vehicle onboard machine 1 and the PC 2 can wirelessly communicate with each other. In this case, the buffering unit 42 temporarily stores the information on the user operation, which has triggered the activation process, in the internal memory 35 of the PC 2.

After the buffering unit 42 stores the information on the user operation in the internal memory 35, if the state determination unit 41 determines that there is reached the state where the vehicle onboard machine 1 and PC 2 can wirelessly communicate with each other, the control unit 43 controls the file transmission/reception unit 25 according to the information on the user operation stored in the internal memory 35. Accordingly, the file transmission/reception unit 25 reads out a file specified by the user operation from the hard disk 34, and moves or copies the file to the vehicle onboard machine 1.

For example, even after the buffering unit 42 stores the information on the user operation in the internal memory 35, the activation unit 24 repeatedly transmits the instruction to turn on the power supply of the vehicle onboard machine 1 to the vehicle onboard machine 1, and simultaneously, repeatedly tries to connect to the vehicle onboard machine 1 via the wireless LAN. During this repeated operation, if the vehicle carrying the vehicle onboard machine 1 returns home, and the vehicle onboard machine 1 enters the area where the wireless communication is possible, a response is returned to the process carried out by the activation unit 24. If the state determination unit 41 detects this response, the control unit 43 controls the file transmission/reception unit 25 according to the information on the user operation stored in the internal memory 35. The file transmission/reception unit 25 starts to move or copy the file specified by the user operation to the vehicle onboard machine 1.

Figure 11:
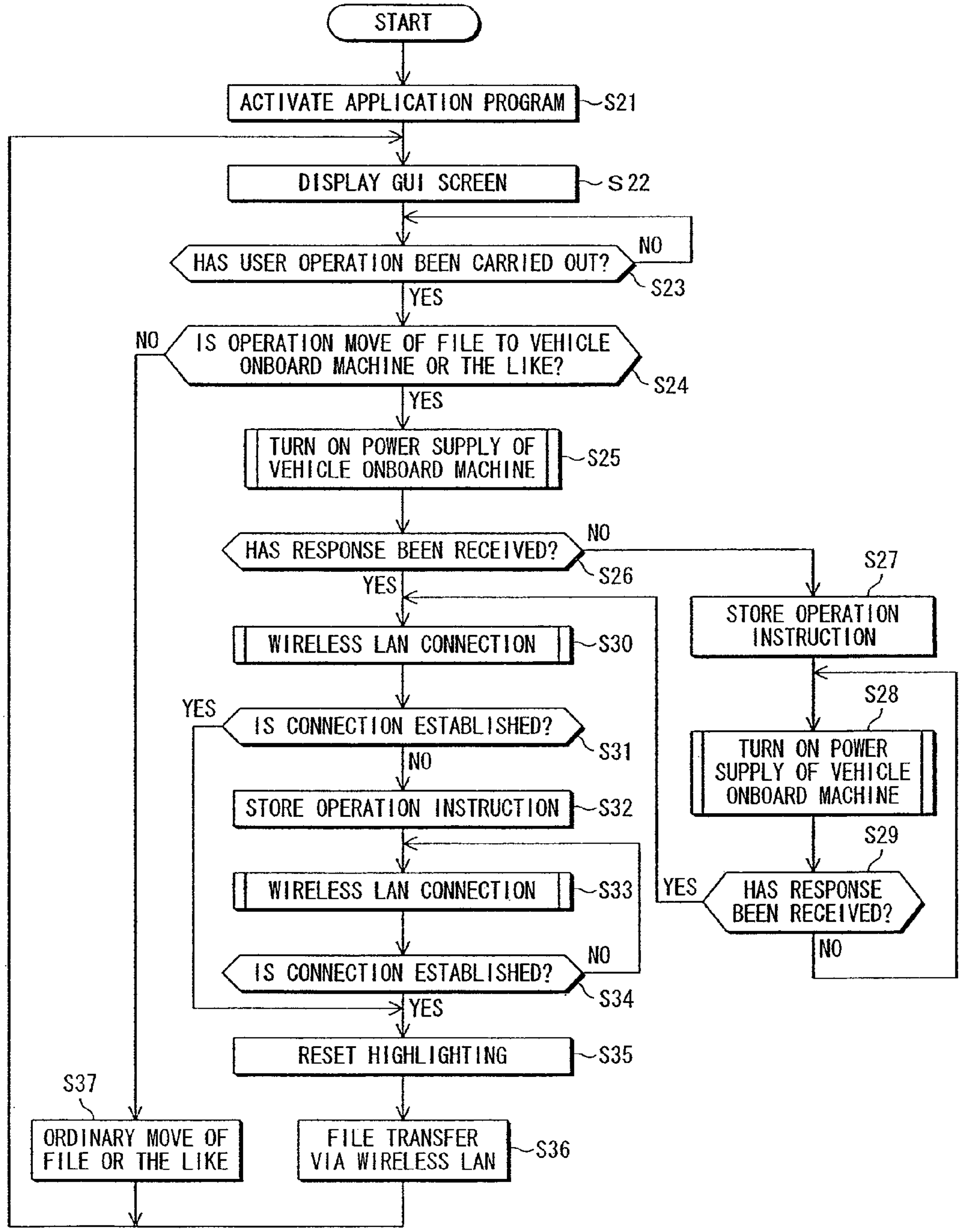
FIG. 11 is a flowchart showing an example of the operation of the information processing system according to the second embodiment while the application program is running.

FIG. 11 is a flowchart showing an example of the operation of the information processing system configured as described above. FIG. 11 shows an example of the operation while the application program 11 is running. An example of the operation when the application program 11 is finished is the same as that shown in FIG. 9.

In FIG. 11, when the application program 11 starts on the PC 2 (step S21), the GUI providing unit 21 shows the GUI screen as shown in FIG. 4 on the display 31 of the PC 2 (step S22). On this occasion, the GUI providing unit 21 highlights the icon of the folder representing the hard disk of the vehicle onboard machine 1.

The operation reception unit 22 is monitoring whether a user operation is carried out via the GUI screen (step S23). If a user operation is carried out, the operation determination unit 23 determines whether the user operation is an operation to move or copy a file to the vehicle onboard machine 1 or not based on operation information supplied by the operation reception unit 22 (step S24).

If the user operation is an operation to move a file to the vehicle onboard machine 1 or the like, the activating unit 24 transmits the instruction information to turn on the power supply of the vehicle onboard machine 1 to the vehicle onboard machine 1 via the small power wireless connection units 3*c* and 3*d* (step S25). If the vehicle onboard machine 1 receives this instruction, the power supply of the vehicle onboard machine 1 is switched to on. Then, the vehicle onboard machine 1 returns a response that the power supply is turned on to the PC 2.

However, if the vehicle onboard machine 1 is not in the area where the vehicle onboard machine 1 can wirelessly communicate with the PC 2 via the small power wireless connection devices 3*c* and 3*d*, the vehicle onboard machine 1 cannot receive the instruction from the PC 2, and cannot thus return a response thereto. Then, the state determination unit 41 determines whether the state determination unit 41 has received a response to the instruction to turn on the power supply of the vehicle onboard machine 1 transmitted by the activation unit 24 (step S26).

If the state determination unit 41 does not receive a response within the predetermined period after the transmission of the instruction by the activation unit 24, the buffering unit 42 stores information on the user operation received by the operation reception unit 22 in the internal memory 35 (step S27). Then, the activation unit 24 again transmits the instruction information to turn on the power supply of the vehicle onboard machine 1 to the vehicle onboard machine 1 via the small power wireless connection devices 3*c* and 3*d* (step S28).

The state determination unit 41 determines whether the state determination unit 41 has received a response to the instruction to turn on the power supply of the vehicle onboard machine 1 transmitted again by the activation unit 24 (step S29). If the state determination unit 41 has not received a response within the predetermined period after the retransmission of the instruction by the activation unit 24, the operation returns to the processing in the step S28, and the same procedure is repeated until a response is received.

If the state determination unit 41 has received a response that the power supply of the vehicle onboard machine 1 is turned on in the step S26 or the step S29, the activation unit 24 controls the wireless LAN access point 3*b* to carry out the process to connect the vehicle onboard machine 1 and the PC 2 with each other via the wireless LAN (step S30). On this occasion, the state determination unit 41 determines whether the wireless LAN connection is established between the vehicle onboard machine 1 and the PC 2 (step S31).

If the wireless LAN connection cannot be established, the buffering unit 42 stores the information on the user operation received by the operation reception unit 22 in the internal memory 35 (step S32). If the buffering process for the operation information has already been finished in the step S27, it is not necessary to execute the buffering process again on this occasion. Then, the activation unit 24 again tries the wireless LAN connection between the vehicle onboard machine 1 and the PC 2 (step S33).

The state determination unit 41 again determines whether the wireless LAN connection is established between the vehicle onboard machine 1 and the PC 2 (step S34). If the wireless LAN connection cannot be established, the operation returns to the processing in the step S33, and the same procedure is repeated until the wireless LAN connection is established.

If the wireless LAN connection is established between the vehicle onboard machine 1 and the PC 2 in the step S31 or the step S34, the GUI providing unit 21 resets the highlighting of the folder representing the hard disk of the vehicle onboard machine 1 (step S35). Then, the file transmission/reception unit 25 moves or copies the file specified by the user operation from the PC 2 to the vehicle onboard machine 1 via the wireless LAN access point 3*b* and the wireless LAN interface card 3*a* (step S36).

If the operation determination unit 23 determines that the user operation is not an operation to move a file to the vehicle onboard machine 1 or the like, namely, that the user operation is an operation to move a file within the same PC 2 or the like in the step S24, the file system 14 carries out a usual process such as moving a file or the like (step S37). After the processing in the step S36 or the step S37 has been carried out, the operation returns to the process in the step S22. On this occasion, the GUI providing unit 21 changes and shows the tree structure on the GUI screen according to a hierarchical structure after moving of the file or the like.

As detailed above, according to the second embodiment, it is determined whether there is reached the state where the vehicle onboard machine 1 and the PC 2 can wirelessly communicate with each other as a result of the activation process carried out by the activation unit 24, and if such a state has not been reached, the information on the user operation is temporarily stored in the internal memory 35. Then, when the state where the wireless communication is possible is reached, a file is moved or copied according to the information on the user operation stored in the internal memory 35.

With this configuration, the user can carry out the operation to move or copy a file absolutely without taking care of whether the power supply of the vehicle onboard machine 1 is turned on or not, as well as whether the vehicle onboard machine 1 is in the area where the vehicle onboard machine 1 can wirelessly communicate with the PC 2. Namely, even if the power supply of the vehicle onboard machine 1 is not turned on, or the vehicle onboard machine 1 is out of the area where the PC 2 can wirelessly communicate with the vehicle onboard machine 1, and thus cannot transfer a file when an operation such as moving a file to the vehicle onboard machine 1 is carried out on the GUI screen, the file is automatically transferred when the file transfer becomes possible subsequently thereto. Thus, once the operation to move or copy a desired file to the vehicle onboard machine 1 is carried out on the GUI screen, other process can be started immediately.

Third Embodiment

Figure 12:
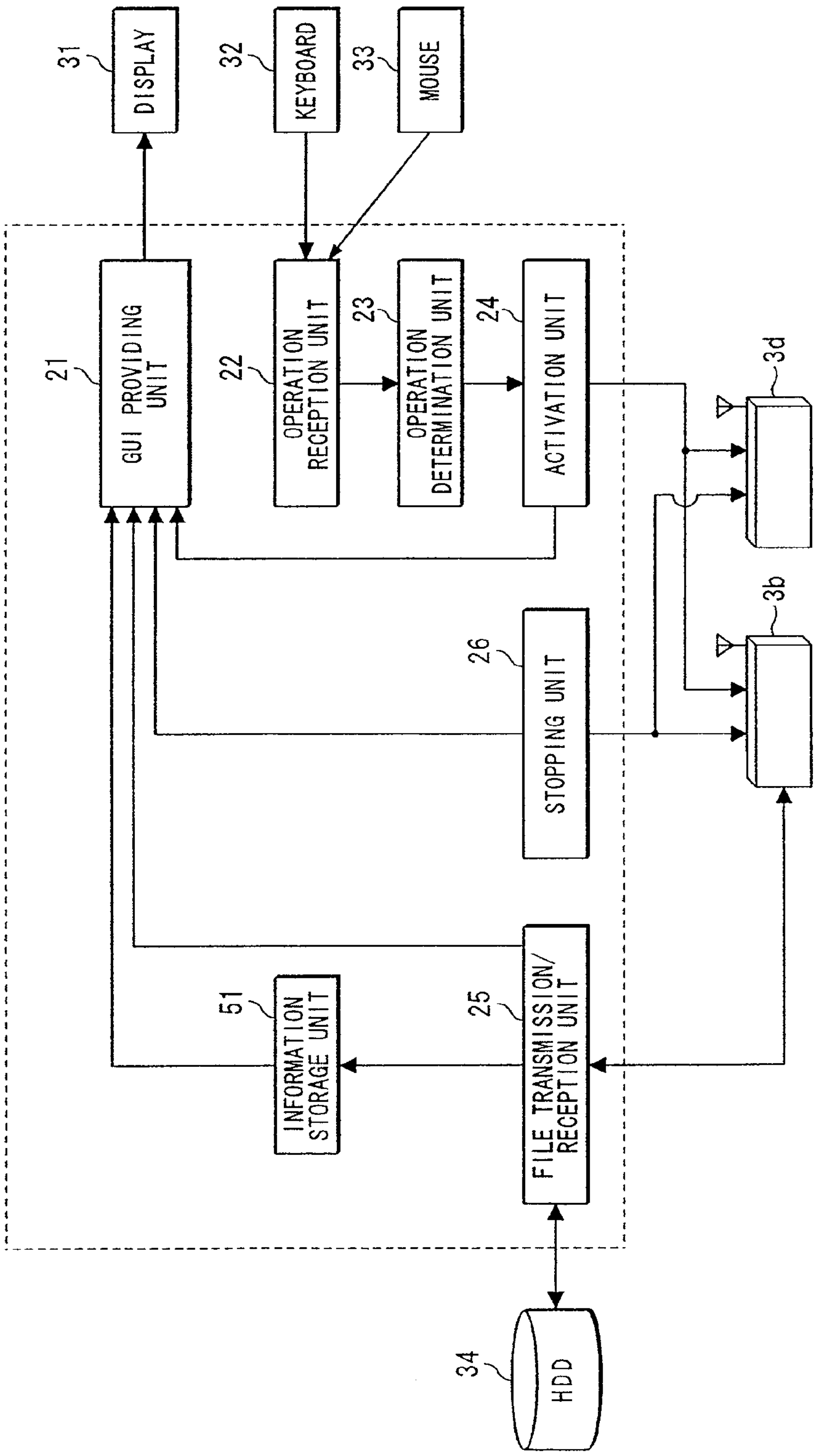
FIG. 12 is a block diagram showing an example of the functional configuration of the PC according to the third embodiment.

A description will now be given of a third embodiment of the present invention with reference to drawings. One implementation of the hardware configuration of the information processing system and the software configuration of the PC 2 are the same as those in FIGS. 1 and 2. FIG. 12 is a block diagram showing an example of the function configuration of the PC 2 according to the third embodiment. In FIG. 12, like components denoted by like numerals as of FIG. 3 have like functions, and will not be further explained.

As shown in FIG. 12, the PC 2 may include an information storage unit 51 in addition to the function configuration shown in FIG. 3. The information storage unit 51 stores the hierarchical structure of the files and folders managed by the file system of the vehicle onboard machine 1 in addition to the hierarchical structure of the files and folders managed by the file system 14 of the PC 2. The information on the hierarchical structure of the files and folders stored in the hard disk of the vehicle onboard machine 1 is acquired by transmitting the information from the vehicle onboard machine 1 to the PC 2 when the vehicle onboard machine 1 and the PC 2 are connected with each other via the wireless LAN, for example. The file transmission/reception unit 25 is also used for the transmission of the hierarchical structure information.

Figure 13:
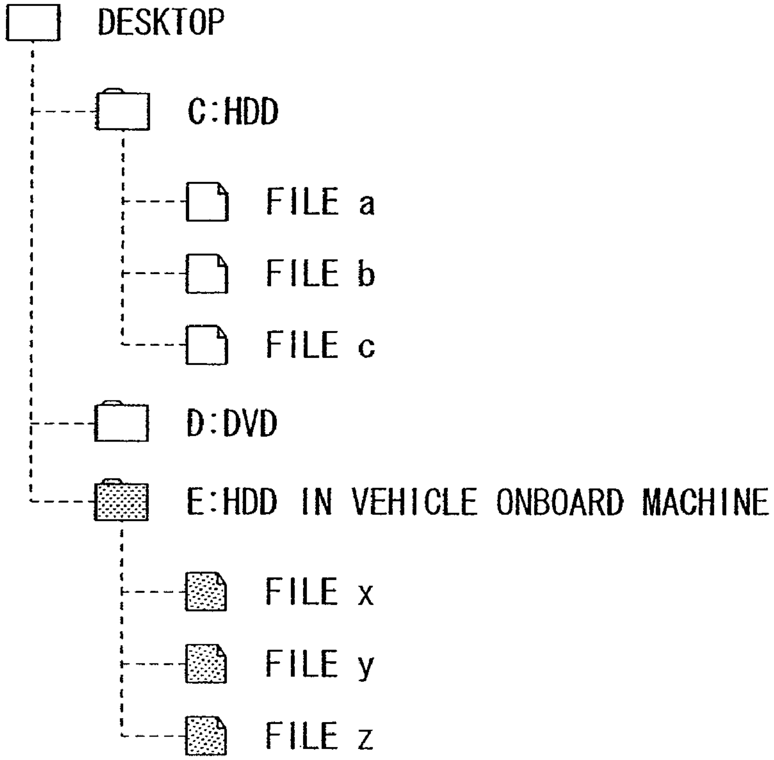
FIG. 13 shows an example of the GUI screen provided by the GUI providing unit according to the third embodiment.

The GUI providing unit 21 uses the hierarchical structure information stored in the information storage unit 51 to show the files and folders stored in the hard disk of the vehicle onboard machine 1 as icons on the GUI screen in addition to the files and folders stored in the hard disk of the PC 2. FIG. 13 shows an example of the GUI screen shown on the display 31 of the PC 2.

In the example shown in FIG. 13, a C drive represents the hard disk in the PC 2, and shows that it contains three files a, b, and c as icons. A D drive represents the DVD drive of the PC 2. Further, an E drive represents the hard disk of the vehicle onboard machine 1 connected to the PC 2 via the wireless LAN, and shows that it contains three files x, y, and z as icons.

The information on the files x, y, and z of the hard disk of the vehicle onboard machine 1 was transmitted from the vehicle onboard machine 1 to the PC 2 when the vehicle onboard machine 1 and the PC 2 were previously connected via the wireless LAN, and was stored in the information storage unit 51. The files x, y, and z themselves are not stored in the information storage unit 51, but the information on the hierarchical structure implemented by the file system which stores the files x, y, and z in the hard disk of the vehicle onboard machine 1 is stored in the information storage unit 51.

On this occasion, highlighted items on the GUI screen in FIG. 13 are items for which a power supply of a corresponding system is not turned on, and which the file system 14 of the PC 2 thus cannot recognize. Namely, the hard disk of the vehicle onboard machine 1 shown as the E drive is turned off, and the file system 14 of the PC 2 thus cannot recognize it. The file system 14 cannot recognize the files x, y, and z of the E drive either.

In some implementations according to the third embodiment, it is possible to carry out an operation to move or copy an arbitrary file represented as an icon on the GUI screen to an arbitrary location by moving the pointer on the GUI screen. For example, as in the first embodiment, it is possible to carry out an operation to move or copy the files a, b, and c of the PC 2 to a DVD on the PC 2 or the hard disk of the vehicle onboard machine 1. Moreover, it is also possible to carry out an operation to move or copy the files x, y, and z of the vehicle onboard machine 1 to the hard disk or a DVD on the PC 2.

The operation receiving unit 22 receives an operation as described above, and outputs operation information thereon to the operation determination unit 23. The operation determination unit 23 determines whether the user operation received by the operation receiving unit 22 is an operation relating to the vehicle onboard machine 1. It is determined whether a user operation is an operation to move or copy a file to the vehicle onboard machine 1 or not, or an operation to move or copy a file from the vehicle onboard machine 1. Then, if the operation is either of them, the activation unit 24 carries out the activation process.

As detailed above, the GUI screen shown on the PC 2 can be used to carry out the operation to move or copy a file from the PC 2 to the vehicle onboard machine 1 as well as the operation to move or copy a file from the vehicle onboard machine 1 to the PC 2. As a result, a file can be easily moved or copied in both directions between the vehicle onboard machine 1 and the PC 2 without a time-consuming operation.

Though the third embodiment is described as an exemplary application of the first embodiment, the third embodiment may be configured as an exemplary application of the second embodiment. Namely, the state determination unit 41, the buffering unit 42, and the internal memory 35 shown in FIG. 10 may be provided in addition to the functional configuration of the PC 2 shown in FIG. 12.

Fourth Embodiment

Figure 14:
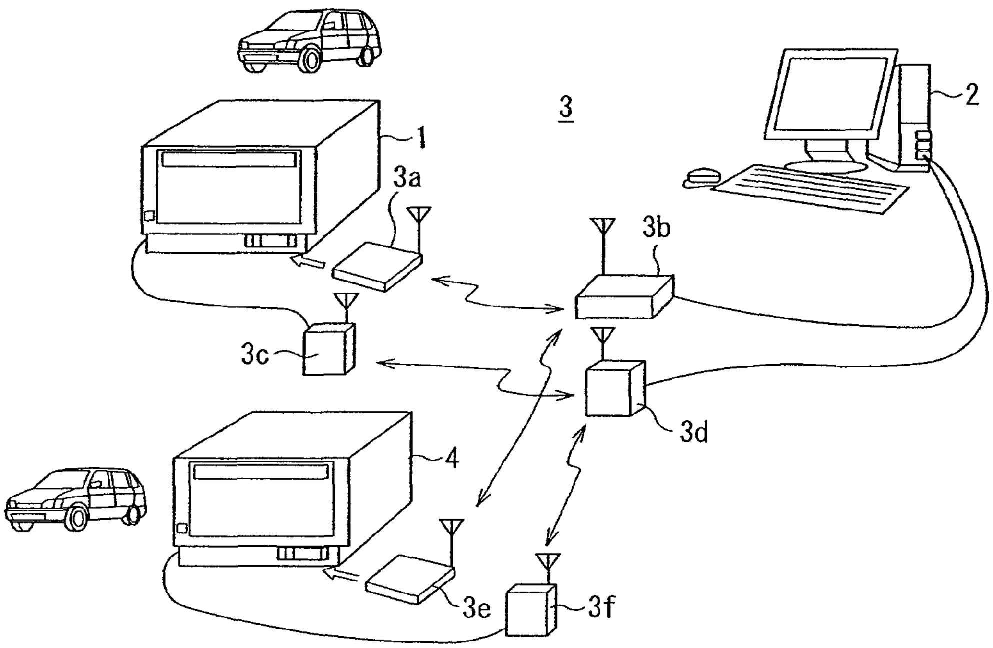
FIG. 14 shows an example of the hardware configuration of the information processing system according to the fourth embodiment.

A description will now be given of a fourth embodiment of the present invention with reference to drawings. FIG. 14 shows an example of one implementation of a hardware configuration of the information processing system according to the fourth embodiment. As shown in FIG. 14, the information processing system may include a first vehicle onboard machine 1 as a first terminal, the PC 2 as a second terminal, a second vehicle onboard machine 4 as a third terminal, and the wireless communication device 3 which wirelessly connects the first vehicle onboard machine 1, the second vehicle onboard machine 4, and the PC 2 with each other for communication.

The first vehicle onboard machine 1 is a center unit of a car navigation device with an integrated audio system, for example, and is installed on a first vehicle. A hard disk is installed on the first vehicle onboard machine 1, and stores audio files and video files to be reproduced. In order to manage these files, the first vehicle onboard machine 1 includes a file system.

The second vehicle onboard machine 4 is a center unit of a car navigation device with an integrated audio system, and is installed on a second vehicle. A hard disk is installed on the second vehicle onboard machine 4, and stores audio files and video files to be reproduced. In order to manage these files, the second vehicle onboard machine 4 also includes a file system.

The PC 2 is set up at home, and also has a hard disk, and the hard disk stores audio files and video files. In order to manage these files, the PC 2 also includes a file system.

The wireless communication device 3 includes devices for wireless LAN connection, and devices for specific small power wireless connection. The wireless communication device 3 includes the wireless LAN interface card 3*a* connected to the first vehicle onboard machine 1, the wireless LAN access point 3*b* connected to the PC 2, and a wireless LAN interface card 3*e* connected to the second vehicle onboard machine 4 for wireless LAN connection. Moreover, the wireless communication device 3 includes the small power wireless connection device 3*c* connected to the first vehicle onboard machine 1, the small power wireless connection device 3*d* connected to the PC 2, and a small power wireless connection device 3*f* connected to the second vehicle onboard machine 4 for the specific small power wireless connection.

The wireless LAN interface card 3*a* of the first vehicle onboard machine 1, the wireless LAN access point 3*b* of the PC 2, and the wireless LAN interface card 3*e* of the second vehicle onboard machine 4 wirelessly communicate files. Further, the small power wireless connection devices 3*c*, 3*d*, and 3*f* are used as system starters for the first vehicle onboard machine 1 and the second vehicle onboard machine 4. Namely, respective power supplies of the first vehicle onboard machine 1 and the second vehicle onboard machine 4 are switched on and off by transmitting power supply switching instructions from the small power wireless connection device 3*d* of the PC 2 respectively to the small power wireless connection device 3*c* of the first vehicle onboard machine 1 and the small power wireless connection device 3*f* of the second vehicle onboard machine 4.

The software configuration of the PC 2 may be the same as that shown in FIG. 2. Moreover, the functional configuration of the PC 2 is the same as that shown in FIG. 12, for example. The information storage unit 51 shown in FIG. 12 stores the hierarchical structure of the files and folders managed by the file system 14 of the first vehicle onboard machine 1 and the hierarchical structure of the files and folders managed by the file system 14 of the second vehicle onboard machine 4 in addition to the hierarchical structure of the files and folders managed by the file system 14 of the PC 2 itself.

The information on the hierarchical structure of the files and folders stored in the hard disk of the first vehicle onboard machine 1 is acquired by transmitting the information from the first vehicle onboard machine 1 to the PC 2 when the first vehicle onboard machine 1 and the PC 2 are connected via the wireless LAN, for example. Similarly, the information on the hierarchical structure of the files and folders stored in the hard disk of the second vehicle onboard machine 4 is acquired by transmitting the information from the second vehicle onboard machine 4 to the PC 2 when the second vehicle onboard machine 4 and the PC 2 are connected via the wireless LAN, for example.

Figure 15:
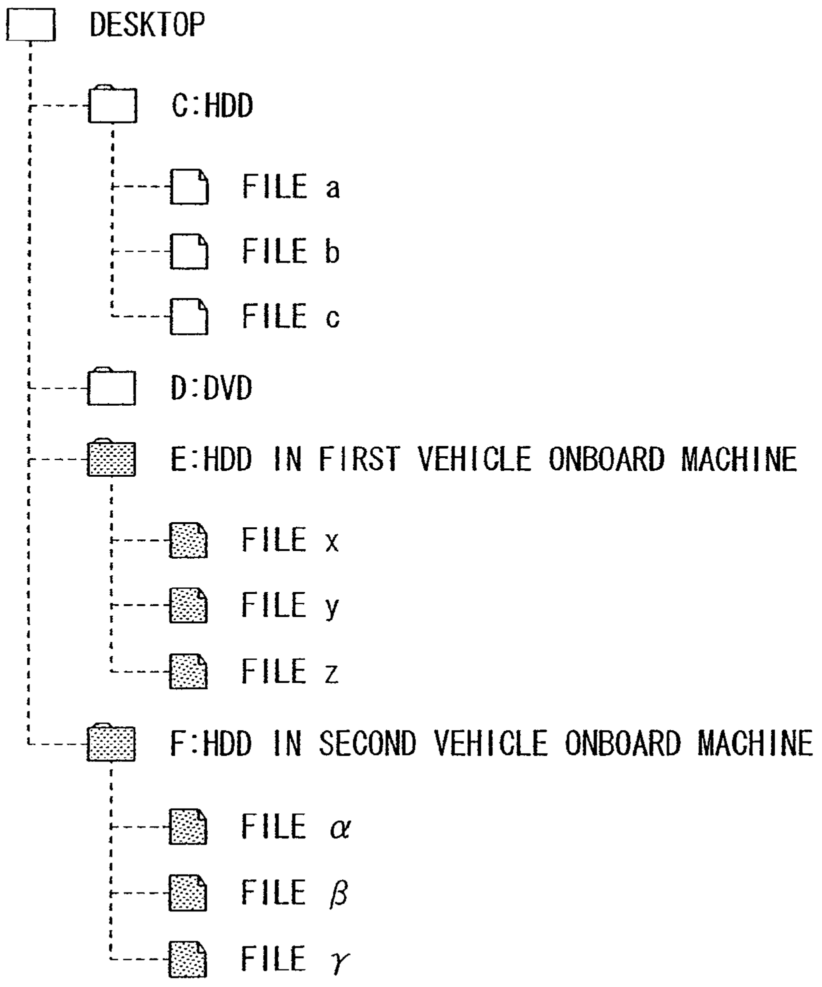
FIG. 15 shows an example of the GUI screen provided by the GUI providing unit according to the fourth embodiment.

The GUI providing unit 21 uses the hierarchical information stored in the information storage unit 51 to show the files and folders stored in the hard disk of the first vehicle onboard machine 1 and the files and folders stored in the hard disk of the second vehicle onboard machine 4 as icons on the GUI screen in addition to the files and folders stored in the hard disk of the PC 2. FIG. 15 shows an example of the GUI screen shown on the display 31 of the PC 2.

In the example shown in FIG. 15, a C drive represents the hard disk in the PC 2, and shows that it contains three files a, b, and c as icons. A D drive represents the DVD drive of the PC 2. Moreover, an E drive represents the hard disk of the first vehicle onboard machine 1, and shows that it contains three files x, y, and z as icons. Moreover, an F drive represents the hard disk of the second vehicle onboard machine 4, and shows that it contains three files α, β, and γ as icons.

The information on the files x, y, and z of the hard disk of the first vehicle onboard machine 1 was transmitted from the first vehicle onboard machine 1 to the PC 2 when the first vehicle onboard machine 1 and the PC 2 were previously connected via the wireless LAN, and was stored in the information storage unit 51. The files x, y, and z themselves are not stored in the information storage unit 51, but the information on the hierarchical structure implemented by the file system which stores the files x, y, and z in the hard disk of the first vehicle onboard machine 1 is stored in the information storage unit 51.

The information on the files α, β, and γ of the hard disk of the second vehicle onboard machine 4 was transmitted from the second vehicle onboard machine 4 to the PC 2 when the second vehicle onboard machine 4 and the PC 2 were previously connected via the wireless LAN, and was stored in the information storage unit 51. The files α, β, and γ themselves are not stored in the information storage unit 51, but the information on the hierarchical structure implemented by the file system which stores the files α, β, and γ in the hard disk of the second vehicle onboard machine 4 is stored in the information storage unit 51.

On this occasion, highlighted items on the GUI screen in FIG. 15 are items for which a power supply of a corresponding system is not turned on, and which the file system 14 of the PC 2 thus cannot recognize. Namely, the hard disk of the first vehicle onboard machine 1 shown as the E drive and the hard disk of the second vehicle onboard machine 4 shown as the F drive are turned off, and the file system 14 of the PC 2 thus cannot recognize them. The file system 14 cannot recognize the files x, y, and z of the E drive and the files α, β, and γ of the F drive either.

An arbitrary file represented as an icon on the GUI screen can be moved or copied to an arbitrary location by moving the pointer on the GUI screen. For example, it is possible to carry out an operation to move or copy the files a, b, and c of the PC 2 to a DVD on the PC 2, to the hard disk of the first vehicle onboard machine 1, or to the hard disk of the second vehicle onboard machine 4. Moreover, it is also possible to carry out an operation to move or copy the files x, y, and z of the first vehicle onboard machine 1 to the hard disk or a DVD on the PC 2, or to the hard disk of the second vehicle onboard machine 4. Further, it is also possible to carry out an operation to move or copy the files α, β, and γ of the second vehicle onboard machine 4 to the hard disk or a DVD on the PC 2 or to the hard disk of the first vehicle onboard machine 1.

The operation receiving unit 22 receives an operation as described above, and outputs operation information thereon to the operation determination unit 23. The operation determination unit 23 determines whether the user operation received by the operation receiving unit 22 is an operation relating to the first vehicle onboard machine 1 or not or the second vehicle onboard machine 4 or not. Then, if the operation is either or both of them, the activation process is carried out by the activation unit 24.

Namely, if the user operation is an operation relating to the first vehicle onboard machine 1, the activation process is carried out for the first vehicle onboard machine 1 by the activation unit 24. If the user operation is an operation relating to the second vehicle onboard machine 4, the activation process is carried out for the second vehicle onboard machine 4 by the activation unit 24. Moreover, if the user operation is an operation relating to the first vehicle onboard machine 1 and the second vehicle onboard machine 4, the process is carried out by the activation unit 24 for the first vehicle onboard machine 1 and the second vehicle onboard machine 4. Then, a file is moved or copied.

As a file transfer method for moving or copying a file between the first vehicle onboard machine 1 and the second vehicle onboard machine 4, there are a method which transfers a file by way of the PC 2, and a method which transfers a file directly between the first vehicle onboard machine 1 and the second vehicle onboard machine 4 without routing the PC 2. First, a description will be given of the first method. The description will be given on an example where the file x stored in the first vehicle onboard machine 1 is moved to the second vehicle onboard machine 4.

In this case, the activation unit 24 controls the small power wireless connection devices 3*d* and 3*f* to transmit the instructions to turn on respectively the power supply of the first vehicle onboard machine 1 and the second vehicle onboard machine 4 to the first vehicle onboard machine 1 and the second vehicle onboard machine 4 via the small power wireless connection devices 3*d* and 3*f*. Moreover, the activation unit 24 controls the wireless LAN access point 3*b* to carry out a process to connect the first vehicle onboard machine 1 and the PC 2 with each other, and the second onboard machine 4 and the PC 2 with each other via the wireless LAN.

Moreover, the respective file systems of the first vehicle onboard machine 1 and the PC 2 move the file x from the first vehicle onboard machine 1 to the PC 2. Then, the respective file systems of the PC 2 and the second vehicle onboard machine 4 move the file x from the PC 2 to the second vehicle onboard machine 4. Specifically, first, the file system (file transmission/reception unit 25) of the PC 2 transmits an instruction to the first vehicle onboard machine 1 to acquire the file x, and the PC 2 acquires the file x from the first vehicle onboard machine 1. Then, the file system (file transmission/reception unit 25) of the PC 2 transmits an instruction to provide the second vehicle onboard machine 4 with the file x, and the second vehicle onboard machine 4 acquires the file x from the PC 2.

If there is reached a state where both the first vehicle onboard machine 1 and the second vehicle onboard machine 4 can wirelessly communicate with each other (the power supplies are on and the wireless LAN connection is established) when the activation unit 24 of the PC 2 carries out the activation process for the first vehicle onboard machine 1 and the second vehicle onboard machine 4, the file transfer can be carried out according to the above-described procedure. However, if at least one of the first vehicle onboard machine 1 and the second vehicle onboard machine 4 has not reached the state where wireless communication is possible, the file transfer cannot be carried out according to the above-described procedure. In order to carry out the file transfer wherein at least one of the first vehicle onboard machine 1 and the second vehicle onboard machine 4 has not reached the state where wireless communication is possible, the functions of the PC 2 may be configured as shown in FIG. 16.

Figure 16:
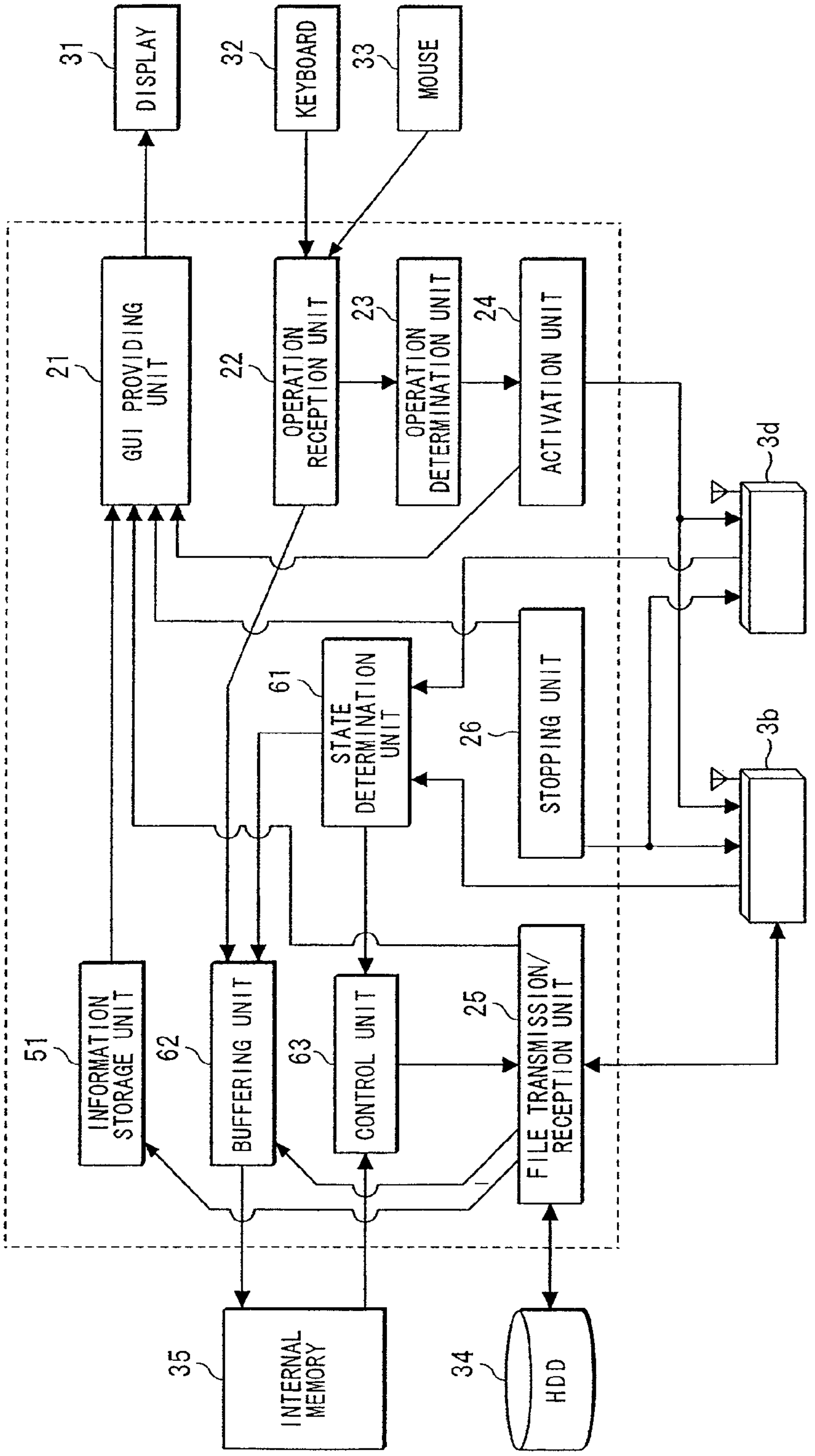
FIG. 16 is a block diagram showing an example of the functional configuration of the PC according to the fourth embodiment.

FIG. 16 is a block diagram showing an example of a functional configuration of the PC 2. In FIG. 16, like components denoted by like numerals as of FIG. 12 have like functions, and will not be further explained. As shown in FIG. 16, the PC 2 may include a state determination unit 61, a buffering unit 62, and a control unit 63 in addition to the function configuration shown in FIG. 12.

The state determination unit 61 determines whether a state is reached where the first vehicle onboard machine 1 and the PC 2 can communicate wirelessly with each other as a result of the activation process by the activation unit 24. Namely, when the activation unit 24 transmits the instruction to turn on the power supply of the first vehicle onboard machine 1 via the small power wireless connection devices 3*c* and 3*d*, the state determination unit 61 determines whether a response thereto has been returned from the first vehicle onboard machine 1 within a predetermined period. Moreover, when the activation unit 24 starts the wireless LAN connection with the first vehicle onboard machine 1 (wireless LAN interface card 3*a*) via the wireless LAN access point 3*b*, the state determination unit 61 determines whether a response that the wireless LAN connection is established has been returned from the wireless LAN access point 3*b*. Then, when the state determination unit 61 has received both the responses, the state determination unit 61 determines that there is reached the state where the first vehicle onboard machine 1 and the PC 2 can wirelessly communicate with each other.

If the state determination unit 61 determines that there is not reached the state where the first vehicle onboard machine 1 and the PC 2 can wirelessly communicate with each other, the buffering unit 62 stores the information on the user operation received by the operation reception unit 22 in the internal memory 35. After the buffering unit 62 stores the information on the user operation in the internal memory 35, the activation unit 24 repeatedly transmits the instruction to turn on the power supply of the first vehicle onboard machine 1 to the first vehicle onboard machine 1, and simultaneously tries to repeatedly connect to the first vehicle onboard machine 1 via the wireless LAN.

During this repeated operation, if the first vehicle carrying the first vehicle onboard machine 1 returns home, and the first vehicle onboard machine 1 enters the area where the wireless communication is possible, a response is returned to the process carried out by the activation unit 24. If the state determination unit 61 detects this response, the control unit 63 controls the file transmission/reception unit 25 according to the information on the user operation stored in the internal memory 35. Accordingly, the file transmission/reception unit 25 acquires the file x from the first vehicle onboard machine 1 by transmitting an instruction to acquire the file x to the first vehicle onboard machine 1.

The state determination unit 61 determines whether there is reached a state where the second vehicle onboard machine 4 and the PC 2 can wirelessly communicate with each other as a result of the activation process by the activating unit 24. Namely, when the activation unit 24 transmits the instruction to turn on the power supply of the second vehicle onboard machine 4 via the small power wireless connection devices 3*d* and 3*f*, the state determination unit 61 determines whether a response thereto has been returned from the second vehicle onboard machine 4 within a predetermined period. Moreover, when the activation unit 24 starts the wireless LAN connection with the second vehicle onboard machine 4 (wireless LAN interface card 3*e*) via the wireless LAN access point 3*b*, the state determination unit 61 determines whether a response that the wireless LAN connection is established has been returned from the wireless LAN access point 3*b*. Then, when the state determination unit 61 has received both the responses, the state determination unit 61 determines that there is reached the state where the second vehicle onboard machine 4 and the PC 2 can wirelessly communicate with each other. In this way, the state determination unit 61 constitutes a first state determination unit and a second state determination unit.

The buffering unit 62, upon the state determination unit 61 determining that there is not reached the state where the second vehicle onboard machine 4 and the PC 2 can wirelessly communicate with each other, stores information on the user operation received by the operation reception unit 22 in the internal memory 35 of the PC 2. Simultaneously, the buffering unit 62 stores the file x acquired by the file transmission/reception unit 25 from the first vehicle onboard machine 1 in the internal memory 35.

After the buffering unit 62 stores the information on the user operation and the file to be moved or copied in the internal memory 35, the activation unit 24 repeatedly transmits the instruction to the second vehicle onboard machine 4 to turn on the power supply of the second vehicle onboard machine 4. Simultaneously, the activation unit 24 tries to repeatedly connect to the second vehicle onboard machine 4 via the wireless LAN. During this repeated operation, if the second vehicle carrying the second vehicle onboard machine 4 returns home, and the second vehicle onboard machine 4 enters the area where the wireless communication is possible, a response is returned to the process carried out by the activation unit 24. If the state determination unit 61 detects this response, the control unit 63 controls the file transmission/reception unit 25 according to the information on the user operation stored in the internal memory 35. Accordingly, the file transmission/reception unit 25 transfers the file x read out by the control unit 63 from the internal memory 35 to the second vehicle onboard machine 4.

Figure 17:
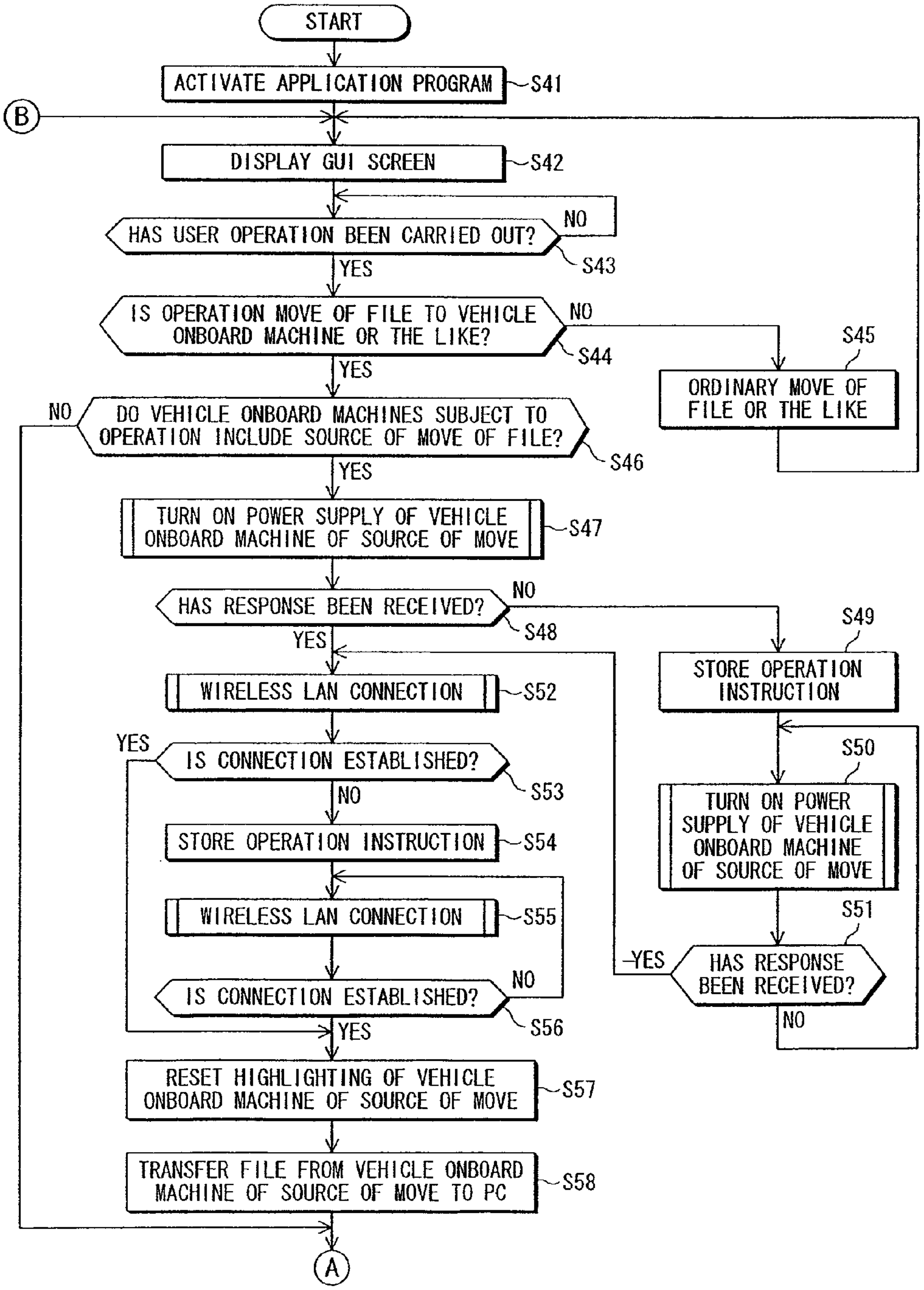
FIG. 17 is a flowchart showing an example of the operation of the information processing system according to the fourth embodiment while the application program is running.
Figure 18:
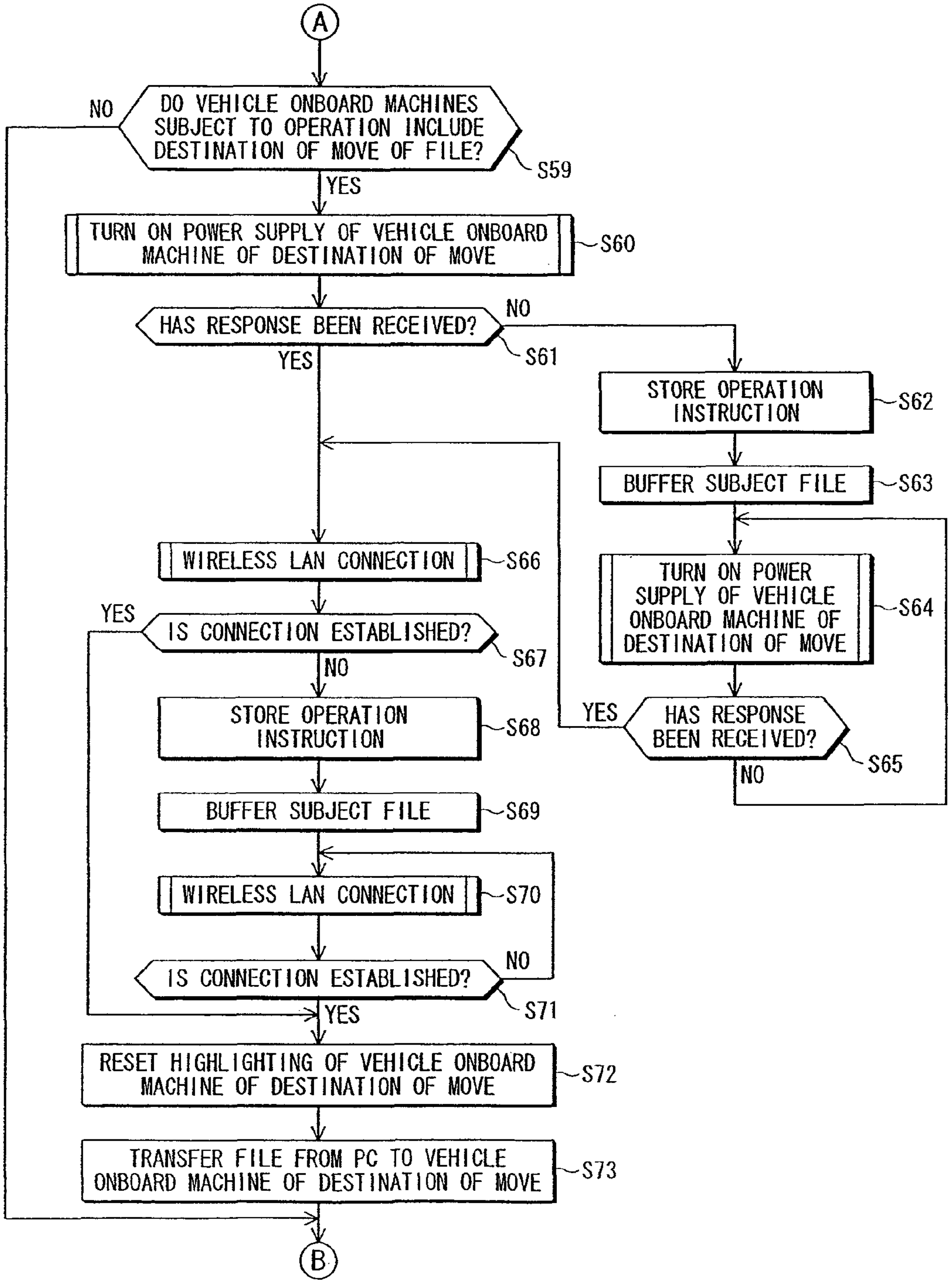
FIG. 18 is a flowchart showing the example of the operation of the information processing system according to the fourth embodiment while the application program is running.

FIGS. 17 and 18 are flowcharts showing an example of the operation to transfer a file between the first vehicle onboard machine 1 and the second vehicle onboard machine 4 via the PC 2 in the information processing system configured as shown in FIG. 16. FIGS. 17 and 18 show an example of the operation while the application program 11 of the PC 2 is running. An example of the operation when the application program 11 is finished is the same as that shown in FIG. 9.

In FIG. 17, when the application program 11 starts on the PC 2 (step S41), the GUI providing unit 21 shows the GUI screen as shown in FIG. 4 on the display 31 of the PC 2 (step S42). On this occasion, the GUI providing unit 21 highlights the icon of the folder representing the hard disk of the first vehicle onboard machine 1 and the hard disk of the second vehicle onboard machine 4.

The operation reception unit 22 is monitoring whether a user operation is carried out via the GUI screen (step S43). If a user operation is carried out, the operation determination unit 23 determines whether the user operation is an operation to move or copy a file to the first vehicle onboard machine 1 or the second vehicle onboard machine 4 based on operation information supplied by the operation receiving unit 22 (step S44).

If the operation determination unit 23 determines that the user operation is not an operation directed to either one of the vehicle onboard machines, namely, that the user operation is an operation to move a file within the same PC 2 or the like, the file system 14 carries out a usual process such as moving a file or the like (step S45). Then, the operation returns to the processing in the step S42. On this occasion, the GUI providing unit 21 changes and shows the tree structure on the GUI screen according to the hierarchical structures after moving of the file or the like.

On the other hand, if the user operation is an operation to move a file to the first vehicle onboard machine 1 or the second vehicle onboard machine 4 or the like, the operation determination unit 23 further determines whether the vehicle onboard machines subject to the operation include a source of the move or copy of the file (step S46). Then, if the vehicle onboard machines subject to the operation include the source of the file transfer, the activation unit 24 transmits an instruction to the vehicle onboard machine of the source of the file transfer to turn on the power supply (step S47).

For example, if there has been carried out a user operation to move the file x from the first vehicle onboard machine 1 to the second vehicle onboard machine 4, since the first vehicle onboard machine 1 is the source of the transfer of the file x, the activation unit 24 transmits an instruction to turn on the power supply of the first vehicle onboard machine 1 to the first vehicle onboard machine 1 via the small power wireless connection devices 3*c* and 3*d*. If the first vehicle onboard machine 1 receives this instruction, the power supply of the first vehicle onboard machine 1 is switched to on. Then, the first vehicle onboard machine 1 returns a response that the power supply is turned on to the PC 2.

If the first vehicle onboard machine 1 is not in the area where the first vehicle onboard machine 1 can wirelessly communicate with the PC 2 via the small power wireless connection devices 3*c* and 3*d*, the first vehicle onboard machine 1 cannot receive the instruction from the PC 2, and cannot thus return a response thereto. Then, the state determination unit 61 determines whether the state determination unit 61 has received a response to the instruction to turn on the power supply of the first vehicle onboard machine 1 transmitted by the activation unit 24 (step S48).

If the state determination unit 61 has not received a response within the predetermined period after the transmission of the instruction by the activation unit 24, the buffering unit 62 stores the information on the user operation (operation instruction to move the file x from the first vehicle onboard machine 1 to the second vehicle onboard machine 4) received by the operation reception unit 22 in the internal memory 35 (step S49). Then, the activation unit 24 again transmits the instruction to turn on the power supply of the first vehicle onboard machine 1 to the first vehicle onboard machine 1 (step S50).

The state determination unit 61 determines whether the state determination unit 61 has received a response to the instruction to turn on the power supply of the first vehicle onboard machine 1 transmitted again by the activation unit 24 (step S51). If the state determination unit 61 has not received a response within the predetermined period after the retransmission of the instruction by the activation unit 24, the operation returns to the processing in the step S50, and the same procedure is repeated until a response is received.

If the state determination unit 61 has received a response that the power supply of the first vehicle onboard machine 1 is turned on in the step 48 or the step S51, the activation unit 24 controls the wireless LAN access point 3*b* to carry out the process to connect the first vehicle onboard machine 1 and the PC 2 with each other via the wireless LAN (step S52). On this occasion, the state determination unit 61 determines whether the wireless LAN connection is established between the first vehicle onboard machine 1 and the PC 2 (step S53).

If the wireless LAN connection cannot be established, the buffering unit 62 stores the information on the user operation received by the operation reception unit 22 in the internal memory 35 (step S54). If the buffering process for the operation information has already been finished in the step S49, it is not necessary to execute the buffering process again on this occasion. Then, the activation unit 24 again tries the wireless LAN connection between the first vehicle onboard machine 1 and the PC 2 (step S55).

The state determination unit 61 again determines whether the wireless LAN connection is established between the first vehicle onboard machine 1 and the PC 2 (step S56). If the wireless LAN connection cannot be established, the operation returns to the processing in the step S55, and the same procedure is repeated until the wireless LAN connection is established.

If the wireless LAN connection is established between the first vehicle onboard machine 1 and the PC 2 in the step S53 or the step S56, the GUI providing unit 21 resets the highlighting of the folder representing the hard disk of the first vehicle onboard machine 1 (step S57). Then, the file system 14 (file transmission/reception unit 25) of the PC 2 transmits an instruction to acquire the file x to the first vehicle onboard machine 1, and thus transfers the file x from the first vehicle onboard machine 1 to the PC 2 (step S58).

Then, the operation proceeds to processing in a step S59 in FIG. 18, and the operation determination unit 23 determines whether the vehicle onboard machines subject to the operation include a destination of the copy or move of the file. If the operation determination unit 23 determines that the vehicle onboard machines subject to the operation do not include the source of the move or copy in the step S46, the operation proceeds to the processing in the step S59.

If the operation determination unit 23 determines that the vehicle onboard machines subject to the operation include the destination of the file transfer in the step S59, the activation unit 24 transmits an instruction to the vehicle onboard machine of the destination of the file transfer to turn on the power supply (step S60). For example, if there has been carried out the user operation to move the file x from the first vehicle onboard machine 1 to the second vehicle onboard machine 4, since the second vehicle onboard machine 4 is the destination of the transfer of the file x, the activation unit 24 transmits an instruction to turn on the power supply of the second vehicle onboard machine 4 to the second vehicle onboard machine 4 via the small power wireless connection devices 3*d* and 3*f*. If the second vehicle onboard machine 4 receives this instruction, the power supply of the second vehicle onboard machine 4 is switched to on. Then, the second vehicle onboard machine 4 returns a response that the power supply is turned on to the PC 2.

If the second vehicle onboard machine 4 is not in the area where the second vehicle onboard machine 4 can wirelessly communicate with the PC 2 via the small power wireless connection devices 3*d* and 3*f*, the second vehicle onboard machine 4 cannot receive the instruction from the PC 2, and cannot thus return a response thereto. Then, the state determination unit 61 determines whether the state determination unit 61 has received a response to the instruction to turn on the power supply of the second vehicle onboard machine 4 transmitted by the activation unit 24 (step S61).

If the state determination unit 61 has not received a response within the predetermined period after the transmission of the instruction by the activation unit 24, the buffering unit 62 stores information on the user operation received by the operation reception unit 22 in the internal memory 35 (step S62). Moreover, the buffering unit 62 stores the file to be moved or copied by the user operation in the internal memory 35 (step S63). For example, if there has been carried out the user operation to move the file x from the first vehicle onboard machine 1 to the second vehicle onboard machine 4, since the file x has been transferred from the first vehicle onboard machine 1 to the PC 2 in the step S58, the buffering unit 62 stores the file x acquired from the first vehicle onboard machine 1 in the internal memory 35.

Then, the activation unit 24 again transmits the instruction to turn on the power supply of the second vehicle onboard machine 4 to the second vehicle onboard machine 4 (step S64). The state determination unit 61 determines whether the state determination unit 61 has received a response to the instruction to turn on the power supply of the second vehicle onboard machine 4 transmitted again by the activation unit 24 (step S65). Then, if the state determination unit 61 has not received a response within the predetermined period after the retransmission of the instruction by the activation unit 24, the operation returns to the processing in the step S64, and the same procedure is repeated until a response is received.

If the state determination unit 61 has received a response that the power supply of the second vehicle onboard machine 4 is turned on in the step S61 or in the step S65, the activation unit 24 controls the wireless LAN access point 3*b* to carry out the process to connect the second vehicle onboard machine 4 and the PC 2 with each other via the wireless LAN (step S66). On this occasion, the state determination unit 61 determines whether the wireless LAN connection is established between the second vehicle onboard machine 4 and the PC 2 (step S67).

If the wireless LAN connection cannot be established, the buffering unit 62 stores the information on the user operation received by the operation reception unit 22 in the internal memory 35 (step S68). Moreover, the buffering unit 62 stores the file transmitted from the first vehicle onboard machine 1 in the step S58 in the internal memory 35 (step S69). If the buffering process for the operation information and the subject file has already been finished in the steps S62 and S63, it is not necessary to execute the buffering process again on this occasion. Then, the activation unit 24 again tries the wireless LAN connection between the second vehicle onboard machine 4 and the PC 2 (step S70).

The state determination unit 61 again determines whether the wireless LAN connection is established between the second vehicle onboard machine 4 and the PC 2 (step S71). Then, if the wireless LAN connection cannot be established, the operation returns to the processing in the step S70, and the same procedure is repeated until the wireless LAN connection is established.

If the wireless LAN connection is established between the second vehicle onboard machine 4 and the PC 2 in the step S67 or the step S71, the GUI providing unit 21 resets the highlighting of the folder representing the hard disk of the second vehicle onboard machine 4 (step S72). Then, the file transmission/reception unit 25 transfers the file x from the PC 2 to the second vehicle onboard machine 4 by transmitting an instruction to provide the file x to the second vehicle onboard machine 4 via the wireless LAN access point 3*b* and the wireless LAN interface card 3*e* (step S73).

A description will now be given of the method to directly transfer the file x from the first vehicle onboard machine 1 to the second vehicle onboard machine 4 without routing through the PC 2. In this case, the activation unit 24 controls the small power wireless connection device 3*d* to transmit an instruction to turn on the power supply of the first vehicle onboard machine 1 and the second vehicle onboard machine 4 to the first vehicle onboard machine 1 and the second vehicle onboard machine 4. Moreover, the activation unit 24 controls the wireless LAN access point 3*b* to carry out a process to connect the first vehicle onboard machine 1 and the second vehicle onboard machine 4 with each other via the wireless LAN. Further, the file systems respectively provided for the first vehicle onboard machine 1 and the second vehicle onboard machine 4 directly transfer the file x from the first vehicle onboard machine 1 to the second vehicle onboard machine 4.

For example, the function SOCKET is used to connect the first vehicle onboard machine 1 and the second vehicle onboard machine 4 with each other via the wireless LAN, thereby directly transmitting the file x from the first vehicle onboard machine 1 to the second vehicle onboard machine 4. Specifically, rolls as a server and a client are assigned respectively to the first vehicle onboard machine 1 and the second vehicle onboard machine 4 in advance by directly specifying IP addresses. It is necessary to use IP addresses having the same network address and subnet mask.

For example, the addresses are specified as follows.

| | | |
|---|---|---|
| First vehicle onboard machine | IP address | 172.31.161.2 |
| | Subnet mask | 255.255.255.0 |
| Second vehicle onboard machine | IP address | 172.31.161.1 |
| | Subnet mask | 255.255.255.0 |

With the above configuration, the file x can be directly transmitted from the first vehicle onboard machine 1 to the second vehicle onboard machine 4 as a file is transferred from a server to a client.

When the file x is transferred from the first vehicle onboard machine 1 to the second vehicle onboard machine 4 via the PC 2, as shown in FIGS. 17 and 18, the process is carried out in two steps: the power supply of the first vehicle onboard machine 1 is turned on, and the file x is moved from the first vehicle onboard machine 1 to the PC 2 in the steps S46 to S58, and the power supply of the second vehicle onboard machine 4 is turned on, and the file x is moved from the PC 2 to the second vehicle onboard machine 4 in the steps S59 to S73.

On the other hand, when the file x is directly transferred from the first vehicle onboard machine 1 to the second vehicle onboard machine 4 without routing through the PC 2, the power supplies of both of the first vehicle onboard machine 1 and the second vehicle onboard machine 4 are turned on, simultaneously the first vehicle onboard machine 1 and the second vehicle onboard machine 4 are connected via the wireless LAN, and the file x is directly moved from the first vehicle onboard machine 1 to the second vehicle onboard machine 4. Therefore, even if one of the first vehicle onboard machine 1 and the second vehicle onboard machine 4 is not in the state where the wireless communication is possible, an operation instruction such as an instruction to move a file is stored in the internal memory 35, and the activation process is repeated by the activation unit 24. Then, when both the first vehicle onboard machine 1 and the second vehicle onboard machine 4 are in the state where the wireless communication is possible, the operation instruction stored in the internal memory 35 is carried out.

Figure 19:
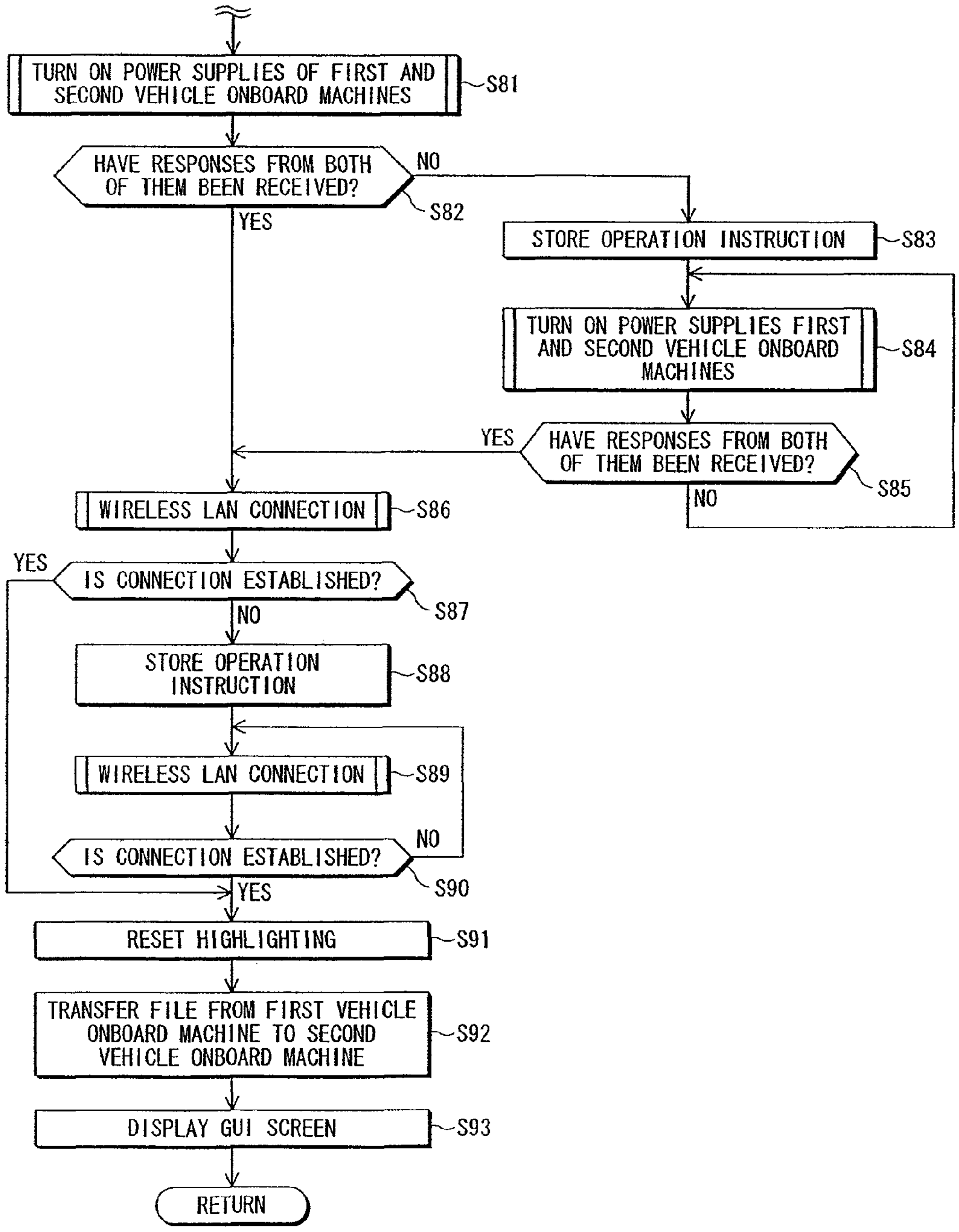
FIG. 19 is a flowchart showing another example of the operation of the information processing system according to the fourth embodiment while the application program is running.
Figure 20:
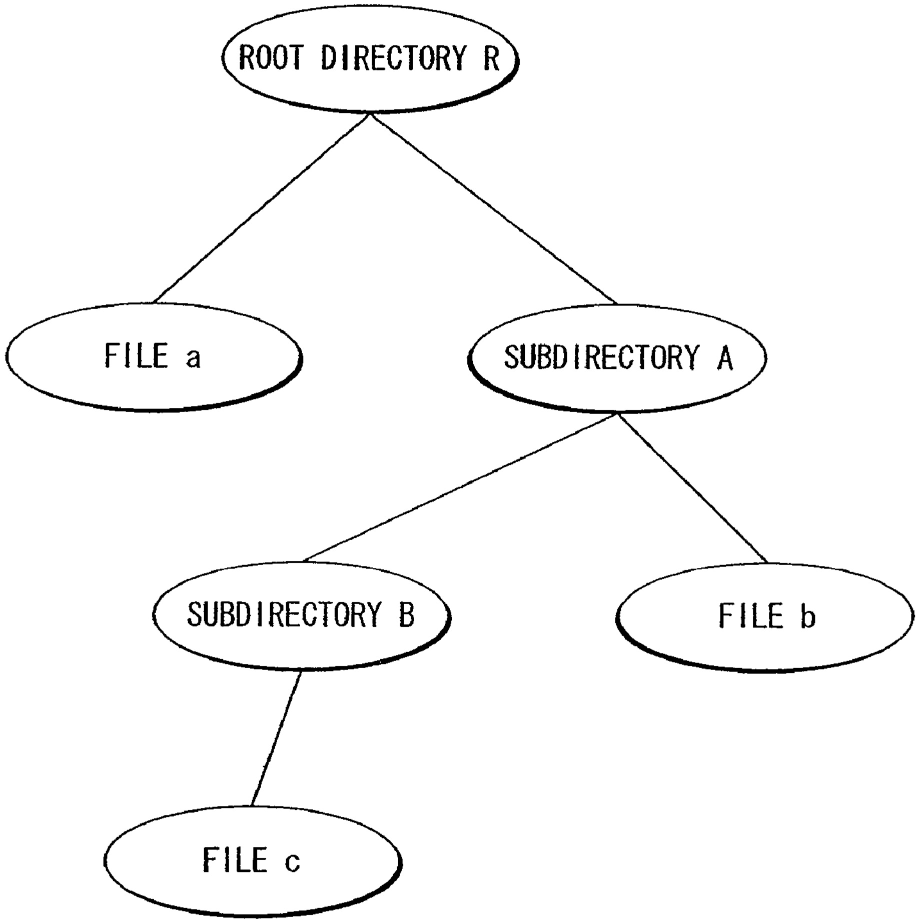
FIG. 20 shows an example of a hierarchical structure managed by a file system.

FIG. 19 is a flowchart of an example of the operation to directly transfer the file x from the first vehicle onboard machine 1 to the second vehicle onboard machine 4 in an information processing system. It should be noted that FIG. 19 shows an operation after the user operation to move the file x from the first vehicle onboard machine 1 to the second vehicle onboard machine 4 has been carried out.

In FIG. 19, the activation unit 24 transmits an instruction to turn on the power supply of the first vehicle onboard machine 1 to the first vehicle onboard machine 1, and simultaneously transmits an instruction to turn on the power supply of the second vehicle onboard machine 4 to the second vehicle onboard machine 4 (step S81). If the first vehicle onboard machine 1 receives this instruction, the power supply of the first vehicle onboard machine 1 is switched to on. Then, the first vehicle onboard machine 1 returns a response that the power supply is turned on to the PC 2. Similarly, if the second vehicle onboard machine 4 receives this instruction, the power supply of the second vehicle onboard machine 4 is switched to on. Then, the second vehicle onboard machine 4 returns a response that the power supply is turned on to the PC 2.

If the first vehicle onboard machine 1 is not in the area where the vehicle onboard machine 1 can wirelessly communicate with the PC 2, the first vehicle onboard machine 1 cannot receive the instruction from the PC 2, and cannot thus return a response thereto. Moreover, if the second vehicle onboard machine 4 is not in the area where the second vehicle onboard machine 4 can wirelessly communicate with the PC 2, the second vehicle onboard machine 4 cannot receive the instruction from the PC 2, and cannot thus return a response thereto. Then, the state determination unit 61 determines whether the state determination unit 61 has received responses that the power supply is turned on from both the first vehicle onboard machine 1 and the second vehicle onboard machine 4 (step S82).

If the state determination unit 61 has not received a response from at least one of the first vehicle onboard machine 1 and the second vehicle onboard machine 4 within the predetermined period after the transmission of the instructions by the activation unit 24, the buffering unit 62 stores information on the user operation received by the operation reception unit 22 in the internal memory 35 (step S83). Then, the activation unit 24 again transmits the instructions to respectively turn on the power supplies of the first vehicle onboard machine 1 and the second vehicle onboard machine 4 to the first vehicle onboard machine 1 and the second vehicle onboard machine 4 (step S84).

The state determination unit 61 determines whether the state determination unit 61 has received a response to the instructions to respectively turn on the power supplies of the first vehicle onboard machine 1 and the second vehicle onboard machine 4 transmitted again by the activation unit 24 from both of them (step S85). Then, if the state determination unit 61 does not receive a response from at least either of the first vehicle onboard machine 1 and the second vehicle onboard machine 4 within the predetermined period after the retransmission of the instruction by the activation unit 24, the operation returns to the processing in the step S84, and the same procedure is repeated until a response is received from both of them.

If the state determination unit 61 has received responses that the power supply of the first vehicle onboard machine 1 and the power supply of the second vehicle onboard machine 4 are turned on in the step S82 or the step S85, the activation unit 24 controls the wireless LAN access point 3*b* to carry out a process to connect the first vehicle onboard machine 1 and the second vehicle onboard machine 4 with each other via the wireless LAN (step S86). On this occasion, the state determination unit 61 determines whether the wireless LAN connection is established between the first vehicle onboard machine 1 and the second vehicle onboard machine 4 (step S87).

If the wireless LAN connection cannot be established, the buffering unit 62 stores the information on the user operation received by the operation reception unit 22 in the internal memory 35 (step S88). If the buffering process for the operation information has already been finished in the step S83, it is not necessary to execute the buffering process again on this occasion. Then, the activation unit 24 again tries the wireless LAN connection between the first vehicle onboard machine 1 and the second vehicle onboard machine 4 (step S89).

The state determination unit 61 again determines whether the wireless LAN connection is established between the first vehicle onboard machine 1 and the second vehicle onboard machine 4 (step S90). Then, if the wireless LAN connection cannot be established, the operation returns to the processing in the step S89, and the same procedure is repeated until the wireless LAN connection is established.

If the wireless LAN connection is established between the first vehicle onboard machine 1 and the second vehicle onboard machine 4 in the step S87 or the step S90, the GUI providing unit 21 resets the highlighting of the folder representing the hard disk of the first vehicle onboard machine 1 and the folder representing the hard disk of the second vehicle onboard machine 4 (step S91). Then, the file transmission/reception unit 25 calls the function SOCKET directed to the first vehicle onboard machine 1 and the second vehicle onboard machine 4. As a result, the file x is directly transferred from the first vehicle onboard machine 1 and the second vehicle onboard machine 4 (step S92). Then, the GUI providing unit 21 changes and shows the tree structure on the GUI screen according to the hierarchical structure after moving of the file or the like (step S93).

As detailed above, even if a file is moved or copied between the vehicle onboard machines, the process can be carried out by means of the GUI screen shown on the PC 2. On this occasion, it is not necessary to go and turn on the power supplies of the vehicle onboard machines, or to go and turn off the power supplies of the vehicle onboard machines after the operation such as the move of the file. Moreover, when an operation such as a move of a file is being carried out, it is not necessary to take care of whether the power supply of the vehicle onboard machine is turned on, and is present in an area where the wireless communication is possible. As a result, a file can be easily moved or copied between the vehicle onboard machines without a time-consuming operation.

Though the wireless LAN connection is used for the file transfer, and the small power wireless connection is used for the system starter according to the first to fourth embodiments, this configuration is simply an example. Other wireless connection standards may be employed.

Moreover, though the description is given of the case where the folders and files are provided as a tree structure as an example of the GUI screen according to the first to fourth embodiments, the folder and files may be provided as virtual screens referred to as windows.

Further, though the description is given of the vehicle onboard machine and the PC as examples of the terminals according to the first to fourth embodiments, they are simply examples. For example, a television receiver, a DVD recorder, a radio receiver, a home audio device, a portable phone, and a PDA (Personal Digital Assistance) may be used in place of the vehicle onboard machine and the PC as long as they include a file system.

Any of the above embodiments are simply specific examples to embody the present invention, and the technical scope of the present invention should not be interpreted in a limited sense by these embodiments. Namely, the present invention can be embodied in various forms without departing from the spirit or essential characteristics thereof.

The present invention is useful for a system which move and copy files between terminals which include a file system. It is therefore intended that the foregoing detailed description be regarded as illustrative rather than limiting, and that it be understood that it is the following claims, including all equivalents, that are intended to define the spirit and scope of this invention.

What is claimed is:

1. An information processing system including a first terminal, a second terminal, and a wireless communication device which wirelessly connects the first terminal and the second terminal with each other for communication, wherein the first terminal and the second terminal respectively have a file system, the information processing system comprising:

a GUI providing unit configured to provide a display screen of the second terminal with a GUI of the file system;

an operation reception unit configured to receive a user operation carried out on a GUI screen provided by said GUI providing unit;

an operation determination unit configured to determine whether or not the user operation received by the operation reception unit is an operation relating to the first terminal; and an activation unit that, upon the operation determination unit determining that the user operation is an operation relating to the first terminal, is configured to control the wireless communication device to transmit an instruction to turn on a power supply of the first terminal to the first terminal, and is configured to simultaneously wirelessly connect the first terminal and the second terminal with each other via the wireless communication device.

2. The information processing system according to claim 1, wherein the GUI providing unit is configured to display an icon for the first terminal on the display screen identifying whether the power supply of the first terminal is turned on or off.

3. The information processing system according to claim 1, wherein the operation determination unit is configured to determine whether or not the user operation is an operation to move or copy a file to the first terminal, and the activation unit, upon the operation determination unit determining that the user operation is the operation to move or copy a file to the first terminal, is configured to control the wireless communication device to transmit an instruction to turn on a power supply of the first terminal to the first terminal, and is configured to simultaneously wirelessly connect the first terminal and the second terminal with each other.

4. The information processing system according to claim 3, further comprising a stopping unit that, upon the file having been moved or copied, or upon a predetermined timing subsequent thereto, is configured to control the wireless communication device to transmit an instruction to turn off the power supply of the first terminal to the first terminal, and is configured to simultaneously disconnect the wireless connection between the first terminal and the second terminal.

5. The information processing system according to claim 3, further comprising:

a state determination unit configured to determine whether a state is reached where the first terminal and the second terminal can wirelessly communicate with each other as a result of the activation unit wirelessly connecting the first terminal with the second terminal;

a buffering unit that, upon the state determination unit determining that a state has not been reached where the first terminal and the second terminal can wirelessly communicate with each other, is configured to store information on the user operation in a memory; and a control unit that, upon the state determination unit determining that a state has been reached where the first terminal and the second terminal can wirelessly communicate with each other after the buffering unit stores the information on the user operation in the memory, is configured to move or copy the file specified by the user operation to the first terminal according to the information on the user operation stored in the memory.

6. The information processing system according to claim 1, wherein the second terminal includes an information storage unit that is configured to store hierarchical structures of files managed by the file systems of the first terminal and the second terminal, and the GUI providing unit is configured to display a file of the first terminal and a file of the second terminal as icons on the display screen of the second terminal based on the information on the hierarchical structures stored in said information storage unit.

7. An information processing system including a first terminal, a second terminal, a third terminal, a wireless communication device which wirelessly connects the first terminal, the second terminal, and the third terminal with each other for communication, wherein the first terminal, the second terminal, and the third terminal respectively have a file system, the information processing system comprising:

a GUI providing unit configured to provide a display screen of the second terminal with a GUI of the file system;

an operation reception unit configured to receive a user operation carried out on a GUI screen provided by said GUI providing unit;

an operation determination unit configured to determine whether or not a user operation received by the operation reception unit is an operation relating to at least either one of the first terminal and the third terminal; and an activation unit that, upon the operation determination unit determining that the user operation is an operation relating to at least either one of the first terminal and the third terminal, is configured to control the wireless communication device to transmit an instruction to turn on a power supply of the terminal to be operated to the terminal to be operated, and is configured to simultaneously wirelessly connect the terminal to be operated and the second terminal with each other.

8. The information processing system according to claim 7, wherein the second terminal includes an information storage unit that stores hierarchical structures of files managed by the file systems of the first terminal and the third terminal, wherein the GUI providing unit is configured to display a file of the first terminal and a file of the third terminal as icons on the display screen of the second terminal based on the information on the hierarchical structures stored in the information storage unit, wherein the activation unit, upon the operation determination unit determining that the user operation received by said operation reception unit is an operation to move or copy a file from the first terminal to the third terminal, is configured to control the wireless communication device to transmit an instruction to turn on a power supply of the first terminal and the third terminal to the first terminal and the third terminal, and is configured to simultaneously wirelessly connect the first terminal, the second terminal, and the third terminal with each other, and after the file is moved or copied from the first terminal to the second terminal, the file is moved or copied from the second terminal to the third terminal.

9. The information processing system according to claim 8, further comprising:

a first state determination unit configured to determine whether a state is reached where the first terminal and the second terminal can wirelessly communicate with each other as a result of the activation unit wirelessly connecting the terminal to be operated and the second terminal;

a buffering unit that, upon the first state determination unit determining that a state is not reached where the first terminal and the second terminal can wirelessly communicate with each other, is configured to store information on the user operation in a memory; and a control unit that, upon the first state determination unit determining that a state is reached where the first terminal and the second terminal can wirelessly communicate with each other after the buffering unit stores the information on the user operation in the memory, is configured to move or copy the file specified by the user operation from the first terminal to the second terminal according to the information on the user operation stored in the memory.

10. The information processing system according to claim 8, further comprising:

a second state determination unit configured to determine whether a state is reached where the second terminal and the third terminal can wirelessly communicate with each other as a result of the process carried out by the activation unit;

a buffering unit that, upon the second state determination unit determining that a state is not reached where the second terminal and the third terminal can wirelessly communicate with each other, is configured to store information on the user operation and the file acquired from the first terminal in a memory; and a control unit that, upon the second state determination unit determining that a state is reached where the second terminal and the third terminal can wirelessly communicate with each other after the buffering unit stores the information on the user operation and the file in the memory, is configured to copy or move the file stored in the memory from the second terminal to the third terminal according to the information on the user operation stored in the memory.

11. The information processing system according to claim 7, wherein the second terminal includes an information storage unit that stores hierarchical structures of files managed by the file systems of the first terminal and the third terminal, wherein the GUI providing unit is configured to display a file of the first terminal and a file of the third terminal as icons on the display screen of the second terminal based on the information on the hierarchical structures stored in said information storage unit, wherein the activation unit, upon the operation determination unit determining that the user operation received by the operation reception unit is an operation to move or copy a file from the first terminal to the third terminal, is configured to control the wireless communication device to transmit an instruction to turn on a power supply of the first terminal and the third terminal to the first terminal and the third terminal, and is configured to simultaneously wirelessly connect the first terminal and the third terminal with each other, and the file is directly moved or copied from the first terminal to the third terminal.

12. The information processing system according to claim 7, further comprising a stopping unit that, upon the file having been moved or copied, or upon a predetermined timing subsequent thereto, is configured to control the wireless communication device to transmit an instruction to turn off the power supply of the terminal to be operated to the terminal to be operated, and is configured to simultaneously disconnect the wireless connection to the terminal to be operated.

13. A file management method for an information processing system including a vehicle onboard machine installed on a vehicle, an information processing terminal provided outside the vehicle, and a wireless communication device configured to wirelessly connect the vehicle onboard machine and the information processing terminal with each other to wirelessly communicate a file wherein the vehicle onboard machine and the information processing terminal respectively have a file system, the file management method comprising:

a first step of providing a display screen of the information processing terminal with a GUI of the file system;

a second step of receiving a user operation carried out on a GUI screen provided by the first step;

a third step of determining whether the user operation received by the second step is an operation to move or copy a file to the vehicle onboard machine;

a fourth step of, upon the third step determining that the user operation is the operation to move or copy a file to the vehicle onboard machine, controlling the wireless communication device to transmit an instruction to turn on a power supply of the vehicle onboard machine to the vehicle onboard machine, and simultaneously wirelessly connecting the vehicle onboard machine and the information processing terminal with each other via the wireless communication device;

a fifth step of determining whether a state is reached where the vehicle onboard machine and the information processing terminal can wirelessly communicate with each other via the wireless communication device as a result of the process carried out by the fourth step; and a sixth step of, upon the fifth step determining that a state is reached where the vehicle onboard machine and the information processing terminal can wirelessly communicate with each other, moving or copying the file specified by the user operation to the vehicle onboard machine.

14. The file management method according to claim 13, further comprising a seventh step of, upon the file having been moved or copied, or upon a predetermined timing subsequent thereto in the sixth step, controlling the wireless communication device to transmit an instruction to turn off the power supply of the vehicle onboard machine to the vehicle onboard machine, and simultaneously disconnecting the wireless connection between the vehicle onboard machine and the information processing terminal.

15. The file management method according to claim 13, further comprising:

an eighth step of, upon the fifth step determining that a state is not reached where the vehicle onboard machine and the information processing terminal can wirelessly communicate with each other, storing information on the user operation in a memory;

a ninth step of determining whether a state is reached where the vehicle onboard machine and the information processing terminal can wirelessly communicate with each other after the eighth step has stored the information on the user operation in the memory; and a tenth step of, upon the ninth step determining that a state is reached where the vehicle onboard machine and the information processing terminal can wirelessly communicate with each other, moving or copying the file specified by the user operation to the vehicle onboard machine according to the information on the user operation stored in the memory.

* * * * *